US012429947B2

(12) United States Patent
Wallack et al.

(10) Patent No.: US 12,429,947 B2
(45) Date of Patent: Sep. 30, 2025

(54) EQUIPMENT DETECTION USING A WEARABLE DEVICE

(71) Applicant: Axon Enterprise, Inc., Scottsdale, AZ (US)

(72) Inventors: Jacob Wallack, Seattle, WA (US); Robert Murphy, Tacoma, WA (US); Jonathan Lind, Issaquah, WA (US)

(73) Assignee: Axon Enterprise, Inc., Scottsdale, AZ (US)

( * ) Notice: Subject to any disclaimer, the term of this patent is extended or adjusted under 35 U.S.C. 154(b) by 721 days.

(21) Appl. No.: 17/742,226

(22) Filed: May 11, 2022

(65) Prior Publication Data

US 2022/0364829 A1 Nov. 17, 2022

Related U.S. Application Data

(60) Provisional application No. 63/252,566, filed on Oct. 5, 2021, provisional application No. 63/187,309, filed on May 11, 2021.

(51) Int. Cl.
*G06F 3/01* (2006.01)
*A63F 13/837* (2014.01)
(Continued)

(52) U.S. Cl.
CPC .......... *G06F 3/014* (2013.01); *G02B 27/0101* (2013.01); *G02B 27/017* (2013.01);
(Continued)

(58) Field of Classification Search
CPC ..... G06F 3/014; G06F 3/011; G02B 27/0101; G02B 27/017; G02B 2027/0138;
(Continued)

(56) References Cited

U.S. PATENT DOCUMENTS 6,104,379 A * 8/2000 Petrich ................... G06F 3/011
345/157
9,223,786 B1 * 12/2015 Hamrick ............. G06F 16/4393
(Continued)

FOREIGN PATENT DOCUMENTS

JP 2013105330 A 5/2013

OTHER PUBLICATIONS ("Available Features," Web page <https://hub.vive.com/storage/tracking/overview/feature.html>, 4 pages, Jan. 23, 2021, retrieved from Internet Archive Wayback Machine <https://web.archive.org/web/20210123224631/https://hub.vive.com/storage/tracking/overview/feature.html> on Aug. 10, 2022.).
(Continued)

Primary Examiner — Michael J Jansen, II
(74) Attorney, Agent, or Firm — Andrew Graham

(57) ABSTRACT

A simulation system may comprise a headset and an equipment. A wireless communication interface of the headset may receive position information from the equipment. The headset may detect a passively-instrumented object represented in a captured image. The headset may detect a wearable device coupled to the passively-instrumented object. The headset may determine position information for the passively-instrumented object. The headset may present an image of virtual equipment corresponding to the equipment in accordance with the position information from the equipment and the position information detected for the passively-instrumented object.

20 Claims, 11 Drawing Sheets

(51) Int. Cl.
| | |
|---|---|
| *F41G 3/26* | (2006.01) |
| *G02B 27/01* | (2006.01) |
| *G06T 19/00* | (2011.01) |
| *G06V 20/20* | (2022.01) |
| *G06V 40/10* | (2022.01) |
| *G09B 9/00* | (2006.01) |

(52) U.S. Cl.
CPC .............. *G06F 3/011* (2013.01); *G09B 9/003* (2013.01); *A63F 13/837* (2014.09); *F41G 3/26* (2013.01); *G02B 2027/0138* (2013.01); *G02B 2027/014* (2013.01); *G06T 19/006* (2013.01); *G06V 20/20* (2022.01); *G06V 40/107* (2022.01)

(58) Field of Classification Search
CPC . G02B 2027/014; G09B 9/003; A63F 13/837; A63F 13/212; A63F 13/25; A63F 13/58; F41G 3/26; G06T 19/006; G06V 20/20; G06V 40/107
See application file for complete search history.

(56) References Cited

U.S. PATENT DOCUMENTS

| | | | | |
|---|---|---|---|---|
| 10,078,377 | B2 * | 9/2018 | Balan | G06T 19/006 |
| 10,162,414 | B2 * | 12/2018 | Huang | G06F 3/0354 |
| 10,241,573 | B2 * | 3/2019 | Mallinson | A63F 13/235 |
| 10,242,501 | B1 * | 3/2019 | Pusch | H04N 19/43 |
| 10,317,989 | B2 * | 6/2019 | Rouvinez | G06T 19/006 |
| 10,593,101 | B1 * | 3/2020 | Han | G06T 7/55 |
| 10,852,825 | B2 * | 12/2020 | Yoon | G06F 3/014 |
| 11,069,148 | B2 * | 7/2021 | Giurgica-Tiron | G06N 3/044 |
| 11,086,395 | B2 * | 8/2021 | Okutani | G02B 27/017 |
| 11,157,131 | B2 * | 10/2021 | Lee | G06F 1/1686 |
| 11,836,873 | B2 * | 12/2023 | Heitger | G06F 3/0304 |
| 12,056,885 | B2 * | 8/2024 | Wang | G06T 7/55 |
| 12,073,022 | B2 * | 8/2024 | Sun | G06F 3/014 |
| 12,153,726 | B1 * | 11/2024 | Healey | G06T 13/00 |
| 12,210,681 | B2 * | 1/2025 | Lam | G06V 40/11 |
| 2002/0036617 | A1 * | 3/2002 | Pryor | G06F 3/011 |
| | | | | 345/156 |
| 2016/0378204 | A1 * | 12/2016 | Chen | G06V 20/20 |
| | | | | 345/156 |
| 2017/0255254 | A1 * | 9/2017 | Huang | A63F 13/428 |
| 2017/0255261 | A1 * | 9/2017 | Huang | G06F 3/011 |
| 2017/0262045 | A1 * | 9/2017 | Rouvinez | G06F 3/011 |
| 2017/0308166 | A1 * | 10/2017 | Mallinson | A63F 13/212 |
| 2017/0357332 | A1 * | 12/2017 | Balan | G06F 3/017 |
| 2019/0228591 | A1 * | 7/2019 | Giurgica-Tiron | G06N 7/01 |
| 2020/0073483 | A1 * | 3/2020 | Berenzweig | G06N 5/04 |
| 2020/0081532 | A1 * | 3/2020 | Yoon | G06F 3/0383 |
| 2020/0265633 | A1 * | 8/2020 | Okutani | G06F 3/012 |
| 2020/0333940 | A1 * | 10/2020 | Lee | G06F 3/012 |
| 2021/0124917 | A1 * | 4/2021 | Wang | G06T 17/00 |
| 2022/0155850 | A1 * | 5/2022 | Kodeih | G06F 3/011 |
| 2022/0343610 | A1 * | 10/2022 | Heitger | G06F 3/0346 |
| 2022/0364829 | A1 * | 11/2022 | Wallack | G09B 9/003 |
| 2023/0072423 | A1 * | 3/2023 | Osborn | G16H 20/30 |
| 2023/0259207 | A1 * | 8/2023 | Lam | G06F 3/017 |
| | | | | 345/156 |
| 2023/0409114 | A1 * | 12/2023 | Sun | G06F 3/017 |
| 2024/0272764 | A1 * | 8/2024 | Victor-Faichney | G06F 3/017 |
| 2024/0338081 | A1 * | 10/2024 | Rathod | G06F 3/014 |

OTHER PUBLICATIONS

Korean Intellectual Property Office, International Search Report for International Application No. PCT/US2022/028852 mailed Aug. 31, 2022.
IP Australia, Examination Report No. 1 for Australian Application No. 2022203161 mailed May 9, 2023.
European Patent Office, Extended European Search Report for European Patent Application No. 22808300.2 mailed Mar. 13, 2025.
IP Australia, Examination Report for Australian Applicaiton No. 2024203060 mailed Apr. 16, 2025.

* cited by examiner

EQUIPMENT DETECTION USING A WEARABLE DEVICE

FIELD OF THE INVENTION

Embodiments according to various aspects of the present disclosure relate to simulation-based training. Particularly, various embodiments relate to systems, devices, and methods for controlling the simulation-based training in accordance with various user inputs. Various embodiments relate to systems, devices, and methods for detecting equipment in simulation-based training.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the following illustrative figures. In the following figures, like reference numbers refer to similar elements and steps throughout the figures.

Figure 1:
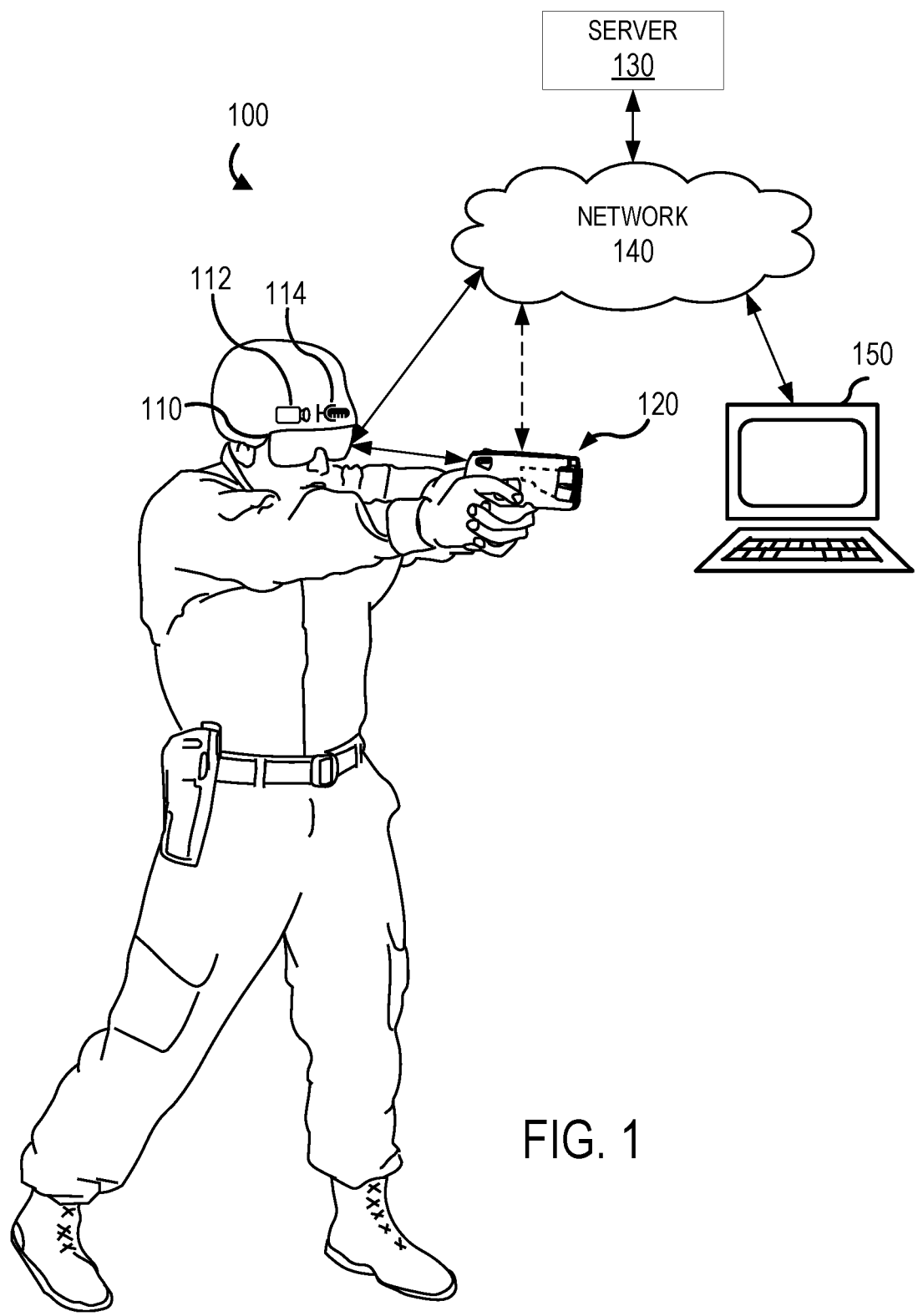
FIG. 1 illustrates a simulation system, in accordance with various embodiments described herein.

Elements and steps in the figures are illustrated for simplicity and clarity and have not necessarily been rendered according to any particular sequence. For example, steps that may be performed concurrently or in different order are illustrated in the figures to help to improve understanding of embodiments of the present disclosure.

DETAILED DESCRIPTION

The detailed description of exemplary embodiments herein makes reference to the accompanying drawings, which show exemplary embodiments by way of illustration. While these embodiments are described in sufficient detail to enable those skilled in the art to practice the disclosures, it should be understood that other embodiments may be realized and that logical changes and adaptations in design and construction may be made in accordance with this disclosure and the teachings herein. Thus, the detailed description herein is presented for purposes of illustration only and not of limitation.

The scope of the disclosure is defined by the appended claims and their legal equivalents rather than by merely the examples described. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, coupled, connected, or the like may include permanent, removable, temporary, partial, full, and/or any other possible attachment option.

Enforcement personnel (e.g., law enforcement officers, police officers, border patrol officers, security guards, etc.) are issued equipment in order to perform their duties. Such equipment may include lethal weapons (e.g., firearms, guns, handguns, etc.), less lethal weapons (e.g., conducted electrical weapons ["CEWs"], etc.), communication devices (e.g., radios, mobile phones, etc.), and recording devices (e.g., wearable cameras, body-worn cameras, wireless microphones, etc.). Enforcement personnel are required to practice with equipment in order to improve situational awareness, decision making and problem-solving skills, stress management, and safe and effective use of the equipment in varying situations. Preferably, training is performed on equipment as similar as possible to the equipment enforcement personnel use in the field.

Enforcement personnel may also encounter a variety of situations during the course of performing their duties. Certain situations may be stressful, unfamiliar, or otherwise challenging for various reasons. Written training materials may educate and prepare personnel for these situations. However, reading about situations may fail to convey an extent of challenges that personnel may encounter during these situations. Training using of role playing may be used to convey auditory and physical challenges of certain situations, though such training may difficult to repeat for multiple users and it may be difficult to find live actors that are familiar with the physical, emotional, and auditory cues that may be associated with different situations.

Simulation based training provides a means for enforcement personnel to repeatably practice with equipment in a variety of situations without the need for using live actors. Simulation based training may use simulated environments to advance the degree of environmental and psychological fidelity available in training. Simulated environments may include augmented reality (AR) environments and virtual reality (VR) environments.

An augmented reality (AR) environment may refer to a user's perception of a real, physical environment with the addition of generated virtual, two- or three-dimensional objects in the real environment. Virtual objects may be perceived to exist in the real space as if they were real objects, with the ability of users to move around the virtual objects, see the virtual objects from different angles, and interact with the virtual objects, as appropriate.

A virtual reality (VR) environment may include a wholly generated virtual environment which may include images, sounds, and other sensations intended to replicate a real or imaginary environment. A virtual environment may simulate a user's physical presence in the virtual environment and enable the user to interact with the virtual space. Virtual environments may be implemented to provide an infinite number of environments and training scenarios.

Establishing an augmented reality environment within a real space may include projecting computer generated virtual objects into the space, where the virtual objects behave as if they are physically in the space. In an augmented reality environment, one or more users may be able to see each other (i.e., actual or virtual representations of each other) and the virtual objects, and interact with the virtual objects and each other.

Virtual reality environments may be established independent of the space and include an entirely virtual space and virtual objects. Virtual representation of one or more users may interact with each other and with the virtual space and virtual objects therein. In a virtual reality system, an entirely virtual image may be simulated for display to a user, and in an augmented reality system, a simulated image may be overlaid or otherwise incorporated with an actual image for display to the user.

A real-world experience may be simulated using an immersive virtual reality or augmented reality. Simulations of real-world experiences may offer enforcement personnel vital training in responding to various scenarios they may encounter in their jobs. Simulations may present multiple decision-making steps, allowing the user to rapidly iterate and learn from the outcomes of each of their choices.

A simulation system may provide feedback (e.g., immediate feedback and/or delayed feedback) based on the user's selections and actions during the simulation. The feedback may include virtual representations of non-player characters (NPCs) during the simulation, and/or a generated summary at the end of the simulation. The simulation system may also compute and provide various metrics and statistics of performance. Additionally, or alternatively, the feedback may include visual, audible, or haptic signals during the simulation and/or at the end of the simulation.

A simulation system may provide a platform on which enforcement personnel may experience and train in various scenarios. The simulation system may compute and display a visual virtual or augmented reality model of an environment, and in accordance with the user's gestures, actions, and/or interactions with equipment, may provide feedback, such as visual, audible, or haptic signals.

A simulation system may include a simulator and a simulation equipment. The simulator may comprise a display. The simulation equipment may comprise a weapon. The simulation equipment may be configured to be virtually projected as virtual equipment in a simulated environment that is generated by the simulator and projected on the display. The display may include an augmented reality display device that allows virtual objects to be represented in a real space, or a virtual reality display device that visually immerses a user in an entirely generated virtual environment. The simulator may be configured to receive inputs from the simulation equipment to track virtual equipment corresponding with the equipment in a simulated environment.

Simulation equipment may include real equipment adapted to be used in a simulation system. Simulation equipment may be configured to provide visual, audible, or haptic inputs to a simulator. Simulation equipment may be displayed as virtual equipment in a simulated environment. A user's interactions with simulation equipment in real space may correspond with the user's interactions with virtual equipment in a simulated environment. At least one of a change in position, a change in orientation, an initial orientation, and an operation of the simulation equipment in a real environment may correspond with at least one of a change in position, a change in orientation, an initial orientation, and an operation of the virtual equipment in the simulated environment.

A real-world experience may be further provided by enabling interaction with a simulated environment in a natural, intuitive manner. Such interaction may include audio input from a user. For example, embodiments according to various aspects of the present disclosure enable a user to interact with a simulated environment using their voice. Such interaction may also include hand gestures, bodily movement, and simulated physical contact with objects in a simulated environment. Devices in a simulation system may avoid wired connections between devices, enabling use of equipment in wireless manner, consistent with how such equipment may be used in a real-world situation. Embodiments according to various aspects of the present disclosure provide these and other improvements to the technical field of simulation-based training.

Embodiments according to various aspects of the present disclosure enable a simulation system to be provided with limited additional devices. For example, embodiments according to various aspects of the present disclosure may enable user input through the use of existing equipment and/or exact replicas of existing equipment. The devices may enable a training simulation to be provided to a user without and/or independent of additional equipment placed on a hand of a user. The devices may enable a training simulation to be provided without and/or independent of equipping a physical space (e.g., training room) with various external sensors, thereby enabling training to be performed in variety of physical location and/or with minimal setup.

In various embodiments, and with reference to FIG. 1, a simulation system 100 is disclosed. Simulation system 100 may be similar to, or have similar aspects and/or components with, the simulation systems previously and/or subsequently discussed herein. It should be understood by one skilled in the art that FIG. 1 is a schematic representation of simulation system 100, and one or more of the components of simulation system 100 may be located in one or more suitable positions within, or external to simulation system 100. Simulation system 100 may a comprise a headset 110, an equipment 120, a server 130, a trainer computing device 150. Such devices may be in communication via one or more communication networks. For example, headset 110, server 130, and trainer computing device 150 may be in communication via network 140. Network 140 may comprise one or more wired and/or wireless connections. Alternately or additionally, headset 110 and equipment 120 may be in direct communication via short range wireless connection. Headset 110, alone or in combination with server 130, may perform operations of a simulator as referenced herein.

In various embodiments, headset 110 may be configured to receive a user input. The user input may comprise a signal associated with an action of a user. Headset 110 may comprise a VR headset and/or an AR headset. Headset 110 may comprise at least one camera 112 configured to capture image data (e.g., an image, video, video data, video signal etc.) in which a physical input (e.g., motion, movement, pose, location, etc.) of a portion of a user is represented. Headset 110 may comprise at least one microphone 114 configured to capture an audio input (e.g., audio data, audio signal, etc.) in which an audio input from a user is provided. The user input may comprise an audio input. Headset 110 may comprise at least one wireless communication interface (not shown) configured to receive a physical input corresponding to user control of equipment 120.

In various embodiments, headset 110 may be configured to provide a simulated environment to a user. Headset 110 may comprise a display (not shown) to visually output (e.g., present) the simulated environment to the user.

In embodiments headset may be configured to communicate with a remote computing device to generate a simulated environment for the user. For example, headset 110 may comprise a wired or wireless communication interface configured to communication with server 130 to generate a simulated environment based on user input.

In various embodiments, equipment 120 may comprise a wearable and/or handheld device used by enforcement personnel. Equipment 120 may be adapted to be used in simulation system 100. Equipment 120 may comprise a wireless device. Equipment 120 may comprise a same form factor as a corresponding real-world device.

In various embodiments, equipment 120 may comprise one of a CEW or a firearm. In real-world usage, a CEW may be used to deliver a current (e.g., stimulus signal, pulses of current, pulses of charge, etc.) through tissue of a human or animal target. The stimulus signal may carry a charge into target tissue. The stimulus signal may interfere with voluntary locomotion of the target. The stimulus signal may cause pain. The pain may also function to encourage the target to stop moving. The stimulus signal may cause skeletal muscles of the target to become stiff (e.g., lock up, freeze, etc.). The stiffening of the muscles in response to a stimulus signal may be referred to as neuromuscular incapacitation ("NMI"). NMI disrupts voluntary control of the muscles of the target. The inability of the target to control its muscles interferes with locomotion by the target. When used with simulation system 100, the CEW may be adapted (e.g., configured, modified, etc.) to deploy non-functional electrodes and/or provide audible or visual feedback that simulates operations associated with providing a stimulus signal. Alternately or additionally, feedback associated with a status of equipment 120 may be provided via headset 110. In embodiments, equipment 120 may alternately or additionally comprise one of a firearm or a bola launcher. In various embodiments, multiple equipment 120 may be provided, wherein each equipment 120 is configured to provide one or more operations of equipment 120 disclosed herein.

In various embodiments, equipment 120 may be configured to transmit an input signal corresponding to at least one of a position (e.g., orientation, pose, motion, movement, rotation, etc.) or a status (e.g., operation, activation, actuation of user interface, etc.) of equipment 120 to headset 110. Headset 110 may perform operations on the input signal and provide an output signal to a display to project virtual equipment in a simulated environment corresponding to equipment 120.

In various embodiments, headset 110 may be configured to receive an input signal corresponding with at least one of a motion and an operation of equipment 120 and project a virtual equipment corresponding with the input signal on a display of headset 100. Headset 110 may comprise a processing circuit and a display configured to generate a simulated environment. The processing circuit and the display may be integrated into headset 110. Headset 110 may comprise a wearable unit configured to be worn on a head of a user to position the display close to eyes of a user. Headset 110 may be fully supported (e.g. mounted, worn, etc.) on the head of the user.

In various embodiments, simulation system 100 may comprise a server configured to aid in analyzing a user input to generate output data to be displayed by a display of headset 110. Server 130 may be in wired and/or wireless communication with one or more of headset 110 and equipment 120 via a network, such as network 140. Network 140 may comprise a wireless communication network using one or more wireless communication protocols, such as WIFI, 2G, 3G, 4G, 5G, LTE, WIMAX, BLUETOOTH, and the like.

In various embodiments, a user input (e.g., user input signal, user input data, etc.) may be uploaded to server 130. Various methods may be used to upload an input signal from a headset 110 and/or equipment 120 to server 130. In an implementation, an equipment may upload an input signal to a server via a wireless connection to a network. For example, equipment 120 may wirelessly transmit a user input an input signal to server 130 via network 140. In another implementation, equipment 120 may transmit an input signal to server 130 via a wired connection to network 140.

A server may store a user input. A server may analyze the user input provided by a CEW. A server may analyze the user input from one or more simulation equipment to determine one or more of a change in position, a change in orientation, an initial orientation, and an operation of the one or more simulation equipment. A server may be configured to generate a virtual equipment in a virtual environment, wherein movement and/or operation of the virtual equipment corresponds with movement and/or operation of a simulation equipment.

A server may generate a virtual environment, virtual objects, or a combination of a virtual environment and virtual objects. The generated virtual environment and/or virtual objects may be projected on a display. At least one of a change in position, change in orientation, initial orientation, and operation of a virtual object may correspond with a real object. For example, an image of a virtual equipment presented in a display of headset 110 may correspond to a real equipment 120 in communication with headset 110.

In embodiments, simulation system 100 may comprise trainer computing device 150. Trainer computing device 150 may be configured to control a virtual environment presented via a display of headset 110. Control inputs (e.g., control signals, control data, etc.) may be received via a user interface of trainer computing device 150 and further provided to one or more of server 130, equipment 120, or headset 110 to control (e.g., modify, adapt, select, etc.) a virtual environment presented via a display of headset. In embodiments, trainer computing device 150 may be configured to receive information regarding operation of headset 110 and/or equipment 120. For example, trainer computing device 150 may receive image data associated with a virtual environment presented via headset 110 so that a trainer at trainer computing device 150 may observe progress of a user through a training simulation.

In embodiments, a simulation system may comprise a plurality of computing devices configured to present a training simulation. For example, and with reference to FIG. 2, simulation system 200 may comprise wearable computing device 210, server computing device 230, and trainer computing device 250. Wearable computing device 210, a server computing device 230, and a trainer computing device 250 may be configured to receive one or more user input and, responsive to the one or more user inputs, present a training simulation comprising one or more visual simulation states via wearable computing device 210. In embodiments, simulation system 200 may comprise equipment 220 and wearable computing device 210, server computing device 230, and trainer computing device 250, and may be configured to detect equipment 220 and present a virtual equipment corresponding to equipment 220 via wearable computing device 210. In embodiments, simulation system 200 may perform one or more operations of simulation system 100 (with brief reference to FIG. 1).

Wearable computing device 210 may be configured to receive user inputs and present one or more visual simulations states to a user. Wearable computing device 210 may comprise a headset. Wearable computing device 210 may comprise a VR headset. A housing of wearable computing device 210 may be configured to be mounted on a head of a user. Wearable computing device 210 may comprise one or more hardware and/or software components. For example, wearable computing device 210 may comprise processor 212, memory 214, wireless communication interface 216, display 218, input audio interface 211, image sensor 213, output audio interface 215, position sensor 217, object detection module 219A, and/or equipment position detection module 219B. In embodiments, and with brief reference to FIG. 1, wearable computing device 210 may perform one or more operations of headset 110.

In various embodiments, processor 212 may be similar to any other processing unit, processor, or the like described herein. Processor 212 may comprise any circuitry, electrical components, electronic components, software, and/or the like configured to perform various operations and functions discussed herein. For example, processor 212 may comprise a processing unit described herein, a processing circuit, a processor, a digital signal processor, a microcontroller, a microprocessor, an application specific integrated circuit (ASIC), a programmable logic device, logic circuitry, state machines, MEMS devices, signal conditioning circuitry, communication circuitry, a computer, a computer-based system, a radio, a network appliance, a data bus, an address bus, and/or any combination thereof.

Processor 212 may be configured to provide and/or receive electrical signals whether digital and/or analog in form. Processor 212 may provide and/or receive digital information via a data bus using any protocol. Processor 212 may receive information, manipulate the received information, and provide the manipulated information. Processor 212 may store information and retrieve stored information. Information received, stored, and/or manipulated by processor 212 may be used to perform a function, control a function, and/or to perform an operation or execute a stored program.

Processor 212 may control the operation and/or function of other circuits and/or components of wearable computing device 210. Processor 212 may receive status information regarding the operation of other components, perform calculations with respect to the status information, and provide commands (e.g., instructions) to one or more other components. Processor 212 may command another component to start operation, continue operation, alter operation, suspend operation, cease operation, or the like. Commands and/or status may be communicated between processor 212 and other circuits and/or components via various types of electronic communication.

In various embodiments, processor 212 may also comprise (or be in electronic communication with) a memory unit capable of storing and maintaining data. The memory unit may comprise any memory unit, database, data structure, memory component, or the like disclosed herein.

In various embodiments, wearable computing device 210 may comprise a memory. For example, wearable computing device 210 may comprise memory 214. The memory may comprise non-transitory computer-readable medium comprising computer-executable instructions that when executed by a processor (e.g., processor 212), perform one or more actions. The non-transitory computer-readable medium may be a tangible, non-transitory memory configured to communicate with the processor. In one embodiment, non-transitory computer-readable medium contains computer-executable instructions that enable user inputs to be received and one or more simulation states to be presented via a display. Those skilled in the art will appreciate that one or more processors and/or computer-readable mediums may be provided as part of one or more various components recited herein.

In various embodiments, wearable computing device 210 may comprise a wireless communication interface. For example, wearable computing device 210 may comprise wireless communication interface 216. Wireless communication interface 216 may comprise suitable hardware and/or software components capable of enabling the transmission and/or reception of data. Wireless communication interface 216 may enable electronic communications between devices and systems. Wireless communication interface 216 may be configured to communicate via a wireless protocol such as an 802.11a/b/g/n/ac signal (e.g., WI-FI), a wireless communications protocol using short wavelength UHF radio waves and defined at least in part by IEEE 802.15.1 (e.g., the BLUETOOTH® protocol maintained by Bluetooth Special Interest Group), a wireless communications protocol defined at least in part by IEEE 802.15.4 (e.g., the ZigBee® protocol maintained by the ZigBee alliance), a cellular protocol, an infrared protocol, an optical protocol, or any other protocol capable of transmitting information via a wireless connection. In embodiments, wireless communication interface 216 may enable wearable computing device 210 to communicate with server computing device 230 and/or trainer computing device 250 via network 240 using a first type of wireless connection (e.g., a WIFI connection, long-range wireless connection, etc.) and communicate with equipment 220 via a second type of wireless connection (e.g., a short-range wireless connection). In embodiments, wireless communication interface 216 may be configured to receive position information from equipment 220.

In various embodiments, wearable computing device 210 may comprise a display. A display may be configured to present visual information to a user. For example, wearable computing device 210 may comprise display 218. Display 218 may include an augmented reality display (e.g., AR display) or a virtual reality display (e.g., VR display). Display 218 may comprise a head-mounted display. Display 218 may include a light emitting diode (LED) display, liquid crystal display (LCD), organic liquid crystal display (OLED), cathode ray tube (CRT) display, plasma display, quantum dot display, projection display, stereoscopic display, holographic display, near-eye display or other display configured to display visual data to a user.

In various embodiments, wearable computing device 210 may comprise at least one input audio interface. An input audio interface may be configured to receive (e.g., detect, transduce, etc.) an audio input from a user. The audio input may comprise an audio signal. The audio input may comprise one or more of an analog audio signal and/or a digital audio signal. The audio input may comprise sounds vocalized by a user. The sounds may comprise one or more words spoken by the user. For example, wearable computing device 210 may comprise input audio interface 211. Input audio interface 211 may comprise a transducer or a connector configured to be coupled to a transducer. In embodiments, input audio interface 211 may comprise at least one microphone, such as microphone 114 with brief reference to FIG. 1. Input audio interface 211 may be positioned proximate to a mouth of a user when wearable computing device 210 is worn by the user.

In various embodiments, wearable computing device 210 may comprise at least one output audio interface. An output audio interface may be configured to transmit (e.g., play, produce, emit, etc.) an audio output to a user. The audio output may comprise an audio signal. The audio output may comprise one or more of an analog audio signal and/or a digital audio signal. The audio output may comprise sounds that may be heard by a user. The sounds may comprise one or more words spoken by a non-playable character ("NPC") or other virtual object or entity in a simulated environment. For example, wearable computing device 210 may comprise output audio interface 215. Output audio interface 215 may comprise a transducer or a connector configured to be coupled to a transducer. In embodiments, output audio interface 215 may comprise at least one speaker (e.g., loudspeaker, headphone, earphone, etc.). Output audio interface 215 may be positioned proximate to an ear of a user when wearable computing device 210 is worn by the user.

In various embodiments, wearable computing device 210 may comprise at least one position sensor. A position sensor may be configured to detect a position and/or changes in position of a wearable computing device. A position sensor may include a radar-based sensor, an infrared sensor, microwave sensor, gyroscope, ultrasonic detector, acoustic sensor, optical sensor, vibration detector, electromagnetic sensor, accelerometer, inertial measurement unit (IMUs), and/or other device or component capable of detecting movement. For example, wearable computing device 210 may comprise at least one position sensor 217. In embodiments, wearable computing device 210 may comprise more than one position sensor 217. For example, position sensor 217 may comprise an accelerometer and gyroscope that are used to detect movement of wearable computing device 210. Position information detected by position sensor 217 may be provided to processor 212 to enable a simulation state presented via display 218 to be updated in accordance with movement of wearable computing device 210 on a user.

In various embodiments, wearable computing device 210 may comprise at least one image sensor. An image sensor may be configured to capture image data. The image data may be generated by the image sensor based on light detected by the image sensor. Capturing image data may comprise converting received light into the image data. The image sensor may comprise one of a charge-coupled device and/or an active-pixel sensor. For example, wearable computing device 210 may comprise image sensor 213. In embodiments, image sensor 213 alone or in combination with memory 214 and/or processor 212, may perform one or more operations of camera 112 with brief reference to FIG. 1. Image sensor 213 may be configured to capture image data of a real-world environment of a user of simulation system 200 and provide the image data for further processing, including detection a position of equipment 220 as further discussed herein. Image sensor 213 may comprise a forward-facing image sensor oriented to receive light in a direction ahead or forward a user when wearable computing device 210 is mounted on the user. Image sensor 213 may comprise an inward-facing image sensor oriented to receive light in a direction toward an eye of a user when wearable computing device 210 is mounted on the user. In embodiments, wearable computing device 210 may be comprise multiple image sensors.

In various embodiments, wearable computing device 210 may comprise an object detection module. An object detection module may comprise one or more software and/or hardware components capable of detecting one or more objects. The object detection module may detect specific objects in image data. For example, an object detection module may be configured to detect portion (e.g., body part) of a user. The portion of the user may comprise an arm, wrist, hand, and/or finger(s) of the user. The object detection module may comprise a trained machine learning model configured to receive image data and detect the one or more objects in the image data. The object detection module may provide detection information in accordance with received image data, wherein the detection information indicates the one or more objects are detected in the image data. The detection information may include a location within the image data of the one or more objects. In embodiments, the detection information may comprise three-dimensional information regarding a physical location of an object of the one or more objects in three-dimensional space. The detection information may comprise three degrees of freedom information of the object. The detection information may comprise three degrees of translational position information of the object. In embodiments, the image data may comprise image data from a plurality of image sensors in a wearable computing device that enables the object detection module to triangulate a position of the object in three-dimensional space relative to wearable computing device. For example, wearable computing device 210 may comprise object detection module 219A. In embodiments, object detection module 219A may be executed by processor 212 and/or implemented in wearable computing device 210 via processor 212 and memory 214. For example, object detection module 219A may comprise computer-readable instructions stored in memory 214 that, when executed by processor 212, cause wearable computing device 210 to perform one or more operations for detecting one or more objects disclosed herein.

In various embodiments, wearable computing device 210 may comprise an equipment position detection module. An equipment position detection module may comprise one or more software and/or hardware components capable of detecting a position of one or more pieces of equipment. The equipment position detection module may detect a position of an equipment in accordance with detection information associated with an object and position information received from the equipment. The equipment position detection module may be configured to generate virtual position information in accordance with the detection information and the position information. The virtual position information may comprise an image of the equipment. The virtual position information may comprise an image of the object. The virtual position information may comprise a location for rendering the image(s) of the equipment and/or the object in a simulated environment. The virtual position information may be provided to a processor configured to render the object and/or equipment in a simulated environment via a display of a wearable computing device. For example, wearable computing device 210 may comprise equipment position detection module 219B. In embodiments, equipment position detection module 219B may be executed by processor 212 and/or implemented in wearable computing device 210 via processor 212 and memory 214. For example, equipment position detection module 219B may comprise computer-readable instructions stored in memory 214 that, when executed by processor 212, cause wearable computing device 210 to perform one or more operations for detecting a virtual position of an equipment as further disclosed herein. For example, an equipment position detection module may be configured to detect a position of equipment 220. The equipment position detection module may receive position information from equipment 220 and detection information from object detection module 219A. In accordance with the position information and the detection information, the equipment position detection module may provide virtual position information to processor 212 for rendering virtual equipment in a simulated environment presented via display 218.

Equipment 220 may be configured to receive one or more user inputs and transmit the one or more user inputs to a wearable computing device. Equipment 220 may comprise one of a firearm, CEW, or recording device. Equipment 220 may be configured to be carried by a user and/or mounted to a user. Equipment 220 may be configured to be manually positioned by a user. Equipment 220 may comprise various software and/or hardware components. For example, equipment 220 may comprise a processor 222, memory 224, wireless communication interface 226, and/or a user interface 228. In embodiments, and with brief reference to FIG. 1, equipment 220 may perform one or more operations of equipment 120.

In embodiments, user interface 228 may be configured to receive a user input from a user. The user input may comprise a physical input. For example, user interface 228 may comprise one or more buttons, switches, triggers, or other actuatable physical elements and the manual input may comprise a physical actuation of one or more such elements. In embodiments, user interface 228 may comprise a housing and one or more position sensors coupled to the housing, and the manual input may comprise a physical input applied to the housing that is further detected by the one or more sensors. In embodiments, processor 222 may receive the user input via user interface 228.

In embodiments, user interface 228 may be configured to generate one or more indications regarding a status of equipment 220. User interface 228 may be configured to provide one or more of audible, visual feedback regarding a status of equipment 220. The feedback may be responsive to a user input received via user interface 228. For example, when a physical input is applied to a trigger of equipment 220, an audible output (e.g., sound) and visual output (e.g., light) may be provided via user interface 228 in accordance with the physical input. In embodiments, inputs and outputs received and provided by user interface 228 may correspond to respective inputs and outputs of equipment 220 when equipment 220 is used in a non-simulated, real-world environment, thereby enabling a user to be trained in a realistic, authentic manner.

In embodiments, processor 222 may be configured to receive signals and provide signals that cause equipment 220 to perform one or more operations. Processor 222 may comprise any circuitry, electrical components, electronic components, software, and/or the like configured to perform various operations and functions discussed herein. For example, processor 222 may comprise a processing unit described herein, a processing circuit, a processor, a digital signal processor, a microcontroller, a microprocessor, an application specific integrated circuit (ASIC), a programmable logic device, logic circuitry, state machines, MEMS devices, signal conditioning circuitry, communication circuitry, a computer, a computer-based system, a radio, a network appliance, a data bus, an address bus, and/or any combination thereof.

In various embodiments, equipment 220 may comprise a memory 224. For example, equipment 220 may comprise memory 224. The memory may comprise non-transitory computer-readable storage medium comprising computer-executable instructions that when executed by a processor (e.g., processor 222), perform one or more actions. The non-transitory computer-readable medium may be a tangible, non-transitory memory configured to communicate with the processor. In one embodiment, non-transitory computer-readable medium contains computer-executable instructions that enable user inputs to be received via user interface 228. The instructions, when executed may cause one or more indications of the user inputs to be output via user interface 228. The non-transitory computer-readable storage medium may comprise computer-executable instructions that, when executed, cause the user inputs to be transmitted from equipment 220 via wireless communication interface 226. For example, the user inputs transmitted via wireless communication interface 226 may comprise status information associated of equipment 220 and/or position information of equipment 220.

In accordance with instructions stored in memory 224, processor 222 may be configured to receive user inputs via user interface 228 and transmit status information in accordance with the user inputs to another device (e.g., wearable computing device 210). For example, processor 220 may receive user inputs corresponding to actuation of one or more of a safety switch, trigger, warning button, mode selection switch, or other user interface element and determine a change in status of equipment 220 instructed by a user in accordance with the user input. Responsive to the user input, processor 222 may control other components of equipment to change a status of equipment 220. For example, processor 222 may enable deployment of a projectile, deploy a projectile, generate an audible and/or visible warning, change a mode of operation in accordance with a user input received via user interface 228. Processor 222 may further cause status information indicating the change in status of equipment to be transmitted via wireless communication interface 226.

In accordance with instructions stored in memory 224, processor 222 may be configured to receive user inputs via user interface 228 and transmit position information in accordance with the user inputs to another device (e.g., wearable computing device 210). For example, processor 220 may receive user inputs corresponding to movement of a housing of equipment 220 and determine a position and/or change in position of equipment 220 applied by a user in accordance with the user input. Responsive to the user input, processor 222 may determine position information of equipment 220. The position information may comprise a pose of equipment 220. The position information may comprise a rotation of equipment in three-dimensional space. The position information may comprise three degrees of freedom information. The three degrees of freedom information may indicate a yaw, pitch, and roll of equipment 220. Processor 222 may further cause position information indicating the position and/or change in position of equipment to be transmitted via wireless communication interface 226. In embodiments, equipment 220 may comprise a position sensor communicatively coupled to processor 222, wherein processor 222 is configured to determine a position and/or change in position of equipment 220 in accordance with information received by the processor 222 from the position sensor. The position sensor may comprise one or more features or components as discussed with regards to position sensor 217. In embodiments, the user interface 228 may comprise at least one position sensor communicatively coupled to processor 222 to enable position information to be generated by equipment 220.

Wireless communication interface 226 may comprise suitable hardware and/or software components capable of enabling the transmission and/or reception of data. Wireless communication interface 226 may enable electronic communications between devices and systems. Wireless communication interface 226 may be configured to communicate via a wireless protocol such as an 802.11a/b/g/n/ac signal (e.g., Wi-Fi), a wireless communications protocol using short wavelength UHF radio waves and defined at least in part by IEEE 802.15.1 (e.g., the BLUETOOTH® protocol maintained by Bluetooth Special Interest Group), a wireless communications protocol defined at least in part by IEEE 802.15.4 (e.g., the ZigBee® protocol maintained by the ZigBee alliance), a cellular protocol, an infrared protocol, an optical protocol, or any other protocol capable of transmitting information via a wireless connection. In embodiments, wireless communication interface 226 may enable equipment 220 to communicate with wearable computing device 210 and/or server computing device 230. In embodiments, wireless communication interface 226 may transmit status information and/or position information from equipment 220 via a short-range wireless connection.

Server computing device 230 may be configured to receive one or more user inputs, perform an analysis on the one or more user inputs, and transmit the analysis. The user inputs may be received from wearable computing device 210 and/or equipment 220. The analysis may be provided to wearable computing device 210 and/or trainer computing device 250. Server computing device 230 may comprise various software and/or hardware components. For example, server computing device 230 may comprise processor 232, memory 234, network interface 236, transcription module 231, sentiment detection module 233, target detection module 235, motion detection module 237, and/or intent detection module 238. In embodiments, and with brief reference to FIG. 1, server computing device 230 may perform one or more operations of server 130.

Computing devices may be appropriate for use in accordance with various embodiments of the present disclosure. While discussed in the context of server computing device 230, the accompanying description of a computing device may be applicable to servers, personal computers, mobile phones, smart phones, tablet computers, embedded computing devices, and other devices that may be used in accordance with embodiments of the present disclosure, including wearable computing device 210 and/or trainer computing device 250.

Server computing device 230 may include processor 232 and a memory 234 connected by a communication bus (not shown). Memory 234 may comprise a system memory. Depending on the exact configuration and type of computing device, the system memory may be volatile or nonvolatile memory, such as read only memory ("ROM"), random access memory ("RAM"), EEPROM, flash memory, or other memory technology. Those of ordinary skill in the art and others will recognize that the system memory typically stores data and/or program modules that are immediately accessible to and/or currently being operated on by processor 232. In this regard, processor 232 may serve as a computational center of server computing device 230 by supporting the execution of instructions. Processor 232 may comprise one or more processing units, as discussed further herein. System memory may comprise one or more memory units, as discussed further herein.

Server computing device 230 may include a network interface 236 comprising one or more components for communicating with other devices and systems over a network. Embodiments of the present disclosure may access basic services that utilize network interface 236 to perform communications using common network protocols.

Memory 234 may also include a storage medium. However, services may be accessed using a computer-based system that does not include means for persisting data to a local storage medium. The storage medium may be volatile or nonvolatile, removable or nonremovable, implemented using any technology capable of storing information such as, but not limited to, a hard drive, solid state drive, CD-ROM, DVD, or other disk storage, magnetic tape, magnetic disk storage, and/or the like. The storage medium may include one or more memory units, as discussed further herein.

As used herein, the term "computer-readable medium" includes volatile and nonvolatile and removable and nonremovable media implemented in any method or technology capable of storing information, such as computer-readable instructions, data structures, program modules, or other data. In this regard, system memory and storage medium of memory 234 are examples of computer-readable media.

Figure 2:
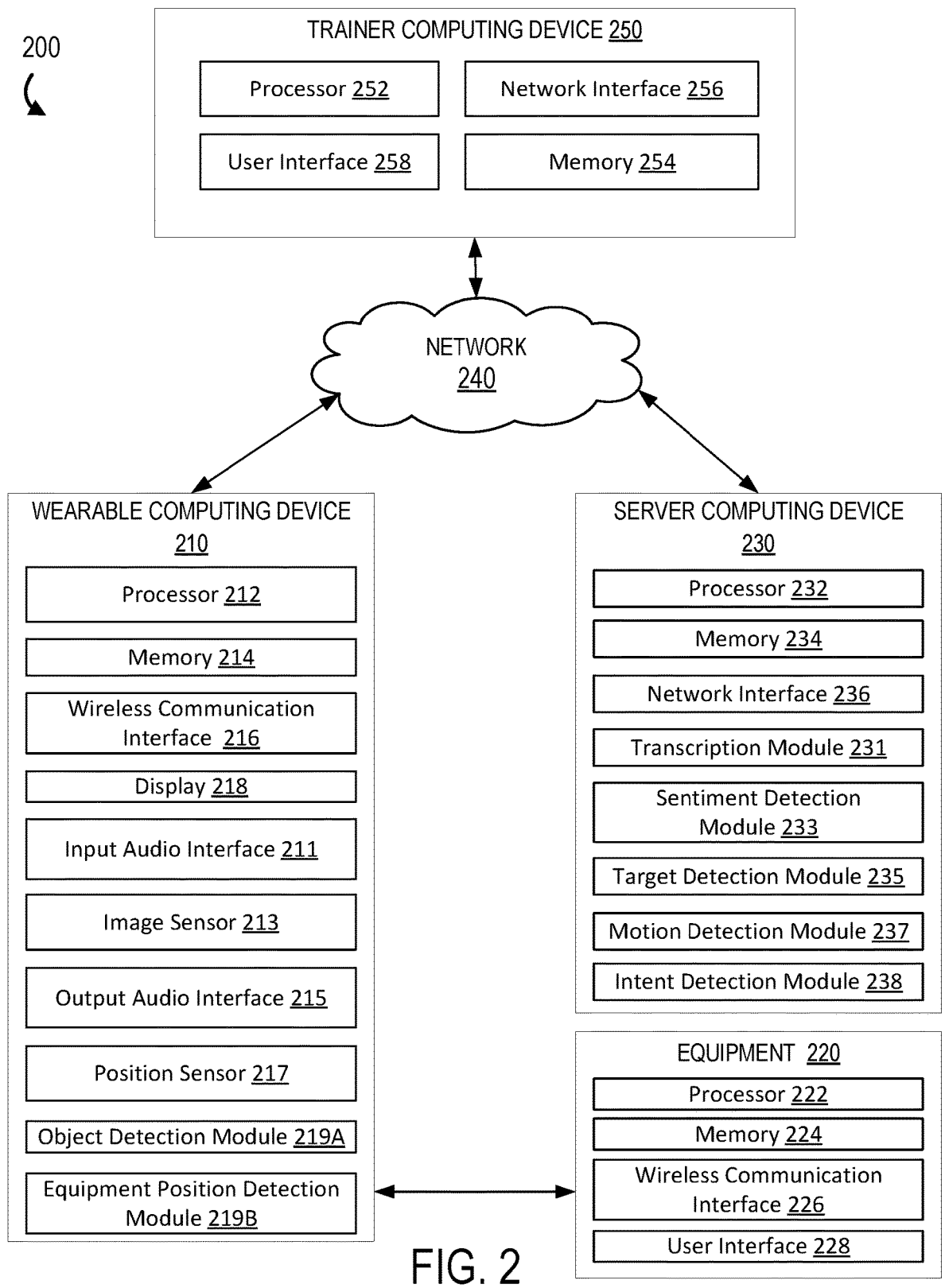
FIG. 2 illustrates a schematic diagram of devices of a simulation system, in accordance with various embodiments described herein.

For ease of illustration and because it is not important for an understanding of the claimed subject matter, FIG. 2 does not show some of the typical components of many computer-based systems. In this regard, server computing device 230 may include input devices, such as a keyboard, keypad, mouse, trackball, microphone, video camera, touchpad, touchscreen, electronic pen, stylus, and/or any other input device described herein. Such input devices may be coupled to server computing device 230 by wired or wireless connections including RF, infrared, serial, parallel, BLUETOOTH®, USB, or other suitable connection protocols using wireless or physical connections.

In any of the described examples, data can be captured by input devices and transmitted or stored for future processing. The processing may include encoding data streams, which can be subsequently decoded for presentation by output devices. Media data can be captured by multimedia input devices and stored by saving media data streams as files on a computer-readable storage medium (e.g., in memory or persistent storage on a client device, server, administrator device, or some other device). Input devices can be separate from and communicatively coupled to server computing device 230 (e.g., a client device), or can be integral components of server computing device 230. In some embodiments, multiple input devices may be combined into a single, multifunction input device (e.g., a video camera with an integrated microphone).

Server computing device 230 may also include output devices such as a display, speakers, printer, and/or any other output device described herein. The output devices may include video output devices such as a display or touchscreen. The output devices also may include audio output devices such as external speakers or earphones. The output devices can be separate from and communicatively coupled to server computing device 230 or can be integral components of server computing device 230. Input functionality and output functionality may be integrated into the same input/output device (e.g., a touchscreen). A suitable input device, output device, or combined input/output device may be used with described systems.

In various embodiments, a "processor" or "processing unit" as described herein may comprise any suitable hardware and/or software-based processing component. For example, a processing unit may comprise one or more of a processing circuit, a processor, an application specific integrated circuit (ASIC), a controller, a microcontroller, a microprocessor, a programmable logic device, logic circuitry, and/or the like.

In various embodiments, a "communication interface" or "network interface" (collectively, "communications unit") as described herein may comprise any suitable hardware and/or software components capable of enabling the transmission and/or reception of data. A communications unit may enable electronic communications between devices and systems. A communications unit may enable communications over a network. Examples of a communications unit may include a modem, a network interface (such as an Ethernet card), a communications port, etc. Data may be transferred via a communications unit in the form of signals which may be electronic, electromagnetic, optical, or other signals capable of being transmitted or received by a communications unit. A communications unit may be configured to communicate via any wired or wireless protocol such as a CAN bus protocol, an Ethernet physical layer protocol (e.g., those using 10BASE-T, 100BASE-T, 1000BASE-T, etc.), an IEEE 1394 interface (e.g., FireWire), Integrated Services for Digital Network (ISDN), a digital subscriber line (DSL), an 802.11a/b/g/n/ac signal (e.g., Wi-Fi), a wireless communications protocol using short wavelength UHF radio waves and defined at least in part by IEEE 802.15.1 (e.g., the BLUETOOTH® protocol maintained by Bluetooth Special Interest Group), a wireless communications protocol defined at least in part by IEEE 802.15.4 (e.g., the ZigBee® protocol maintained by the ZigBee alliance), a cellular protocol, an infrared protocol, an optical protocol, or any other protocol capable of transmitting information via a wired or wireless connection. In embodiments, server computing device 230 may comprise at least one network interface 256 in communication with other devices of simulation system 200 via network 240.

Two or more of the system components may be in electronic communication via a network. As used herein, the term "network" may further include any cloud, cloud computing system, or electronic communications system or method that incorporates hardware and/or software components. Communication amongst the devices and systems over a network may be accomplished through any suitable communication channel, such as, for example, a telephone network, an extranet, an intranet, the internet, a wireless communication, local area network (LAN), wide area network (WAN), virtual private network (VPN), and/or the like.

Electronic communications between the systems and devices may be unsecure. A network may be unsecure. Electronic communications disclosed herein may utilize data encryption. Encryption may be performed by way of any of the techniques now available in the art or which may become available—e.g., Twofish, RSA, El Gamal, Schorr signature, DSA, PGP, PM, GPG (GnuPG), HPE Format-Preserving Encryption (FPE), Voltage, Triple DES, Blowfish, AES, MD5, HMAC, IDEA, RC6, and symmetric and asymmetric cryptosystems. Network communications may also incorporate SHA series cryptographic methods, elliptic-curve cryptography (e.g., ECC, ECDH, ECDSA, etc.), and/or other post-quantum cryptography algorithms under development.

For the sake of brevity, conventional data networking, application development, and other functional aspects of system may not be described in detail herein. Furthermore, the connecting lines shown in the various figures contained herein are intended to represent exemplary functional relationships and/or electronic communications between the various elements. It should be noted that many alternative or additional functional relationships or electronic communications may be present in a practical system.

In various embodiments, a "memory" or "memory unit" as discussed herein may comprise any hardware, software, and/or database component capable of storing and maintaining data. For example, a memory unit may comprise a database, data structure, memory component, or the like. A memory unit may comprise any suitable non-transitory memory known in the art, such as, an internal memory (e.g., random access memory (RAM), read-only memory (ROM), solid state drive (SSD), etc.), removable memory (e.g., an SD card, an xD card, a CompactFlash card, etc.), or the like.

Any database discussed herein may include relational, hierarchical, graphical, distributed ledger, blockchain, object-oriented structure, and/or any other database configurations, unless otherwise specified. Any database may also include a flat file structure wherein data may be stored in a single file in the form of rows and columns, with no structure for indexing and no structural relationships between records. For example, a flat file structure may include a delimited text file, a CSV (comma-separated values) file, and/or any other suitable flat file structure. Moreover, a database may be organized in any suitable manner, for example, as data tables or lookup tables. Each record stored in a database may be a single file, a series of files, a linked series of data fields, and/or any other data structure or schema.

Any database, system, device, server, or other components of the system described herein may consist of any combination thereof at a single location or at multiple locations. For example, any database described herein may comprise a single database or a plurality of databases (virtual partitions or physically distinct). Each database or system may include any of various suitable security features, such as firewalls, access codes, encryption, decryption, compression, decompression, and/or the like.

In various embodiments, an "input device" as discussed herein may comprise hardware and/or software used to provide data, inputs, control signals, and the like to a computer-based system, software application, etc. For example, an input device may include a pointing device (e.g., mouse, joystick, pointer, etc.), a keyboard (e.g., virtual or physical), a touchpad or touchscreen interface, a video input device (e.g., camera, scanner, multi-camera system, etc.), a virtual reality system, an audio input device (e.g., microphone, digital musical instrument, etc.), a biometric input device (e.g., fingerprint scanner, iris scanner, etc.), a composite device (e.g., a device having a plurality of different forms of input), and/or any other input device. Examples of input devices may include an input audio interface, an image sensor, or a user interface.

In various embodiments, an "output device" as discussed herein may comprise hardware and/or software configured to convert information into a human-accessible form, for display, projection, or physical reproduction. For example, an output device may include a display device (e.g., monitor, monochrome display, colored display, CRT, LCD, LED, projector, video card, etc.), an audio output device (e.g., speaker, headphones, sound card, etc.), a location services system (e.g., global positioning system (GPS), etc.), a printer (e.g., dot matrix printer, inkjet printer, laser printer, 3D printer, wide-format printer, etc.), a braille reader, a composite device (e.g., a device having a plurality of different forms of output), and/or any other output device. Examples of output devices may include an output audio interface, a display, or a user interface.

In embodiments, server computing device 230 may comprise one or more modules configured to perform various operations of server computing device 230. The one or more modules may comprise separate hardware and/or software components relative to processor 232 and memory 234. For example, a module may comprise a graphics processor or other specialized electronic circuit configured to perform operations. Alternately or additionally, the one or more modules may be implemented wholly or at least in part via processor 232, memory 234, and/or computer-readable instructions stored on memory 234 that, when executed by processor 232, cause server computing device 230 to perform various operations.

In embodiments, server computing device 230 may comprise transcription module 231. Transcription module 231 may be configured to receive audio input and generate text data in accordance with information included in the audio input. The text data may comprise sets of words detected in the audio input by transcription module 231. The text data may comprise a confidence score for each word representing a likelihood that the word was included the audio input from which the text data was generated. Transcription module 231 may comprise a trained machine learning module configured to receive the audio input and generate the text data. In embodiments, the audio inputs may be received at wearable computing device 210 and transmitted to transcription module 231 via wireless communication interface 216, network 240, and/or network interface 236. The text data may be provided to other components of simulation system 200 for further processing, including one or more of target detection module 235 and intent detection module 238.

In embodiments, server computing device 230 may comprise sentiment detection module 233. Sentiment detection module 233 may be configured to receive user input and generate sentiment information in accordance with the user input. The sentiment information may comprise a sentiment of the user input. The sentiment information may comprise an indication of polarity of the user input. For example, the sentiment information may include an indication of whether a user input appears to convey a positive, neutral, or negative attitude. Alternately or additionally, the sentiment information may identify an emotional state among a plurality of emotional states as been represented in the user input. For example, and in embodiments, sentiment detection module 233 may classify a user input as one of a group of emotional states comprising anger, disgust, calmness, fear, sadness, anxiety, confusion, or joy. Alternately or additionally, the sentiment information may comprise a measurement of each of one or more properties of the user input. For example, the sentiment information may comprise an indication of volume and/or rate of information (e.g., text or gesture) represented in the user input. In embodiments, the user input may comprise an audio input, physical input, and/or a combination of the audio input and the physical input provided by a user. For example, sentiment detection module 233 may perform sentiment detection on an audio input received by audio input interface 211, a physical input represented in image data captured by image sensor 213, a physical input received via user interface 228, or combinations of such user inputs to generate sentiment information. In embodiments, sentiment detection may be applied to text and/or gestures represented in user input. The sentiment information may be provided to other components of simulation system 200 for further processing, including intent detection module 238.

In embodiments, server computing device 230 may comprise motion detection module 237. Motion detection module 237 may be configured to receive user input and generate motion information identifying motion events indicated in the user input. The motion events may comprise a gesture indicated in the user input. For example, motion detection module 237 may receive image data from image sensor 213 and detect a hand gesture made by a user of wearable computing device 210 as indicated in the image data. The gesture may comprise a type selected among a group comprising a lateral waving gesture, a downward waving gesture, a thumbs up gesture, a thumbs down gesture, a stop gesture, and a pointing gesture. Alternately or additionally, motion detection module 237 may receive physical input from user interface 228 and detect a gesture (e.g., aim, pattern of movement, orientation) made with equipment 220 as indicated in the user input. In embodiments, the motion events may comprise a simulated contact with an object in a simulated environment. For example, motion detection module 237 may receive physical input and object information regarding a location of an object (e.g., door, window, vehicle, NPC, etc.) in a simulated environment. Based on a comparison between the physical input and the object information, motion detection module 237 may generate a motion event indicating virtual contact in the simulated environment between the user and the object. The virtual contact may comprise indication of one or more of an intensity, location, and duration contact between a user and the object. The motion event may be provided to other components of simulation system 200 for further processing, including intent detection module 238.

In embodiments, server computing device 230 may comprise target detection module 235. Target detection module 235 may be configured to receive user input and generate target information (e.g., target, target data, etc.) in accordance with the user input. The target information may comprise a target of the user input. The target may comprise an entity in a simulated environment. For example, the target information may include one of an NPC presented in the simulated environment, an equipment, or a non-visible entity represented in the simulated environment. The equipment may comprise a recording device (e.g., body-worn camera) represented in the simulated environment. The non-visible entity may comprise a trainer at trainer computing device 250 or a virtual dispatcher accessible to the user via a communication device (e.g., two-way radio) represented in the simulated environment. The target may be detected in accordance with an audio input. For example, target detection module 235 may detect a target in accordance with one or more words in the audio input that match a name of the target. Alternately or additionally, the target may be detected in accordance with a physical input of the user input. For example, target detection module 235 may detect a target in accordance with a simulated spatial relationship between an equipment and the target. The simulated spatial relationship may be determined based on an orientation between the equipment and a simulated location of the target. For example, when a CEW is aimed toward an NPC in a simulated environment, the NPC may be detected as the target of the user input. As another example, an alignment between an orientation of a field of view of a wearable computing device 210 and an NPC may indicate a user of wearable computing device 210 is looking at the NPC and, accordingly, the NPC may be selected as the target. The target information may be provided to other components of simulation system 200 for further processing, including intent detection module 238.

In embodiments, server computing device 230 may comprise intent detection module 238. Intent detection module 238 may be configured to detect an intent (e.g., intent information, intent data, etc.) in accordance with input data. The intent may indicate a purpose of the user input. The intent may indicate a desired change in a simulation state of a simulated environment. For example, an audio input may comprise a question, indicating a desired auditory response from an entity in a simulated environment. The intent may comprise an action. For example, the action may comprise an action of questioning, instructing, informing, reassuring, listening, arresting, acknowledging, moving, contacting or other actions. The intent may comprise a target. For example, the target may comprise a NPC, an equipment, or a non-visible entity as discussed above. Detecting the intent may comprise applying natural language processing to an audio input of the user input. Detecting the intent may comprise analyzing one or more of text data, sentiment information, motion events, and/or target information discussed above. Accordingly, the intent may be detected in accordance with audio input, physical input, or a combination of audio input and physical input of user input. In embodiments, the intent may be provided to other components of simulation system 200. For example, the intent may be transmitted to processor 212 to selectively change a simulation state presented via display 218 of wearable computing device 210.

In embodiments, processor 212 may be configured to change a simulated environment in accordance with an intent. Changing the simulated environment may comprise performing a comparison between the intent and one or more predetermined intents associated with a simulation state of the simulated environment. Changing the simulated environment may comprise determining the intent matches zero or one predetermined intent of the one more predetermined intents. Accordingly, the comparison may indicate that the intent does match (e.g., has one matching intent) or does not match (e.g., has zero matching intents) the one or more predetermined intents. In accordance with the comparison, the simulation state may be selectively changed.

In embodiments, modules 231, 233, 235, 237, and 238 may be implemented via server computing device 230 of simulation state 200. Alternately or additionally, such modules may be wholly or at least partially implemented in other computing devices, including wearable computing device 210 or trainer computing device 250.

Network 240 may comprise one or more devices configured to enable communication between devices of simulation system 200. For example, network 240 may comprise one or more routers, modems, and/or access points configured to enable wired and/or wireless connections between devices. In embodiments, and with brief reference to FIG. 1, network 240 may perform one or more operations of network 140.

In embodiments, trainer computing device 250 may be configured to control a virtual environment and/or receive information regarding operation of simulation system 200. For example, trainer computing device 250 may receive image data associated with a virtual environment presented via wearable computing device 210 so that a trainer at trainer computing device 250 may observe progress of a user through a training simulation. Trainer computing device 250 may comprise various software and/or hardware components. For example, trainer computing device 250 may comprise processor 252, memory 254, network interface 256, and/or user interface 258. In embodiments, and with brief reference to FIG. 1, trainer computing device 250 may perform one or more operations of trainer computing device 150.

In embodiments, user interface 258 may comprise input and/or output devices. For example, trainer computing device 250 may comprise a keyboard, mouse, touchpad, or other user input device. Trainer computing device 250 may further comprise an output audio and/or video interface, such as a screen and/or a loudspeaker.

Network interface 256 may comprise suitable hardware and/or software components capable of enabling the transmission and/or reception of data. Network interface 256 may enable electronic communications between devices and systems. Network interface 256 may enable electronic communications between trainer computing device 250 and network 240. Network interface 156 may enable wired and/or wireless connections and corresponding protocols as further discussed above. In embodiments, network interface 256 may transmit control information to wearable computing device 210 and/or receive training information from equipment 220 and/or wearable computing device 210 to enable a trainer remote from wearable computing device 210 to observe and control a simulated environment.

In embodiments, trainer computing device 250 may comprise a processor 252 and memory 254 configured to perform one or more operations for enabling a second user (e.g., trainer) to participate in a training simulation. Processor 252 and memory 254 may be similar to one or more other processors and/or memories disclosed herein. Memory 254 may store instructions that, when executed by processor 252, cause trainer computing device 252 to receive user inputs via user interface 258, receive training information from wearable computing device 210 and/or equipment 220, and/or transmit control information to wearable computing device 210.

In embodiments, the virtual environment may be controlled via a trainer computing device 250. For example, a trainer computing device 250 may select or modify a simulation state provided at wearable computing device 210. Audio and/or video associated with a simulation state may be output to a trainer via trainer computing device. Responsive to the output, a trainer may provide an input via the trainer computing device 250 to modify the simulation state. For example, an intent received via wearable computing device 210 and detected by server 230 may be audibly or visually indicated to a trainer via trainer computing device 250. Responsive to the detected intent, the trainer may provide an input that selects an intent different from the detected intent. The trainer may alternately provide an input that confirms the detected intent is accurate. In some embodiment, the detected intent may be determined to be a selected intent, absent an input from a trainer computing device 250. In some embodiments, a selected intent may be received at server computing device 230. Server computing device 230 may modify a simulation state provided to wearable computing device 230 in accordance with the simulation state. In some embodiments, training computing device 250 may provide an intent to server computing device 230 for updating a simulation state independent of whether a detected intent is provided to the trainer computing device 250.

Training using a simulated environment presented by a simulation system may be improved by enabling a user to use a same equipment as they would use in a real-world scenario. For example, enabling an enforcement personnel to use a same CEW as they would while during a real-world incident may improve their familiarity with the same CEW. However, simulation systems may not be configured to incorporate equipment that is not specifically designed for use with a simulation system. Some controllers specifically designed for simulation systems may have integrated infrared lights that enable the controllers to be identified by a simulation system. However, such controllers may cause differences in weight or other variations that fail to replicate use of a real-world equipment. Other controllers may require separate external sensors and/or emitters that encircle a physical space to enable the controllers to be integrated with a simulation system. Such controllers may impose physical limitations on the spaces in which corresponding simulation systems may be provided, as well as increase a time and complexity of setting up such systems. Embodiments according to various aspects of the present disclosure enable equipment having a same form factor as real-world equipment to be integrated in a simulation system with limited additional technical overhead.

In various embodiments, and with reference to FIGS. 3A-3C and 4, methods of detecting a position of an equipment may be provided. The methods may comprise operations performed by one or more devices of a simulation system. For example, the one or more operations may be performed by a wearable computing device 210 with brief reference to FIG. 2. In embodiments, the one or more operations may be performed by object detection module 219A and/or equipment position detection module 219B.

In embodiments, a position of an equipment may be detected in accordance with an image. For example, and with reference to FIG. 3A, an image 310 may be captured by a wearable computing device of a simulation system. Image 310 may be captured by at least one image sensor 213 with brief reference to FIG. 2. Image 310 may be captured by a camera 112 integrated with a headset 110 with brief reference to FIG. 1. Image 310 may comprise an array of pixels generated in accordance with visible and/or infrared light received by an image sensor. Image 310 may represent a real-world field of view of an image sensor integrated with a wearable computing device (e.g., wearable computing device 210). Image 310 may capture a forward-facing field of view. Image 310 may capture a physical state of a user during a simulation state of a simulated environment presented to the user via a display of a wearable computing device. The display may be coupled to a head of a user such that the user may not be able to see the forward-facing view. However, an image sensor may be able to capture image 310 in which real-world activity is represented and incorporate this activity into a simulation state presented to the user.

In various embodiments, image 310 may capture an equipment 320. Equipment 320 may correspond, comprise, and/or perform one or more operations of equipment 120 and/or equipment 220 with brief reference to FIGS. 1-2. Equipment 320 may be manually positioned forward a user (e.g., in a forward-facing field of view, aligned forward a face of the user, etc.) responsive to a simulation state presented to the user via a display of a wearable computing device. In a VR-based simulation system, equipment 320 may not be visible to a user, yet the VR-based simulation system may be configured to represent equipment 320 in the simulation state as further discussed below.

In embodiments, equipment 320 may comprise unmarked equipment. For example, equipment 320 may lack barcodes, quick response codes, or other unique visual indicia. Equipment 320 may be visually unmodified in a visible or infrared spectrum of light for integration with a simulation system. In embodiments, equipment 320 may comprise a fully functional equipment usable in a real-world incident. In embodiments, equipment 320 may comprise a replica of equipment that has appearance, form factor, weight, and/or other features that are identical to equipment usable in a real-world incident. In embodiments, equipment 320 may be configured to transmit position information to a simulation system separately from image 310. For example, equipment 320 may be configured to separately transmit position information via a short-range wireless connection. The position information may be transmitted to a same or different device of the simulation system by which image 310 is captured.

In various embodiments, image 310 may capture one or more non-instrumented objects. A non-instrumented object may not be equipped with a measurement device or a feature specifically added to the object that enables measurement of the feature by a measurement device. A non-instrumented object may be unaltered for inclusion in a simulation system. A non-instrumented object may lack features that are integrated for detection or otherwise improve detection of the object by a simulation system. For example, a non-instrumented object may lack visible lights or infrared lights. The non-instrumented object may lack lights that are specifically intended to enable the object to be detected and/or distinguished from other objects in a physical environment. As an alternate or additional example, a non-instrumented object may lack a transmitter and/or receiver configured to provide an indication of a position of the object. For example, a non-instrumented object may lack an ultrasound transmitter, an ultrasound receiver, a radio transmitter, a radio receiver, one or more combinations of such receivers and/or transmitters, or a plurality of one or more such receivers and transmitters. Rather, a non-instrumented object may be passively captured by a simulation system, including as further discussed below. For example, image 310 may capture a first non-instrumented object 330 and a second non-instrumented object 340.

In embodiments, a non-instrumented object may comprise a portion of a user. The portion may comprise a body of a user. The portion may comprise one or more of an arm, a wrist, a hand, and/or fingers of the user. The portion may be detected by the simulation system independent of other portions of the user. For example, a wrist of a user may be detected without specific detection (e.g., positive indication of inclusion, positive indication of a location, etc.) of one or more fingers of the user, including all fingers of the user. For example, visual information comprising the first portion of the user and the second portion of the user may be captured in image 310. A first non-instrumented object 330 captured in image 310 may comprise the first portion of the user. A second non-instrumented object 340 captured in image 310 may comprise the second portion of the user. Image 310 may comprise image data representing the first portion. Image 310 may comprise image data representing the second portion. In embodiments, the first portion may comprise a left limb of the user. In embodiments, the second portion may comprise a right limb of the user. In embodiments, the first portion may comprise a left arm of the user. In embodiments, the second portion may comprise a right arm of the user. In embodiments, the first portion may comprise a left wrist of the user. In embodiments, the second portion may comprise a right wrist of the user. In embodiments, the first portion may comprise a left hand of the user. In embodiments, the second portion may comprise a right hand of the user. In embodiments, the first portion may comprise at least one finger on a left hand of the user. In embodiments, the second portion may comprise at least one finger on a right hand of the user. In embodiments, only one of first non-instrumented object 330 or second non-instrumented object 340 may be captured in an image in accordance with a pose of the user relative to the sensor by which the image is captured. In embodiments, each of first non-instrumented object 330 and second non-instrumented object 340 may lack non-naturally occurring indicia that enable each non-instrumented object to be specifically captured within image 310 or captured separately from image 310.

In embodiments, one or more devices may be configured to detect a position of an equipment relative to a field of view. The field of view may be a field of view of an image sensor by which image 310 is captured. The field of view may be a forward-facing field of view of a head of a user, though the user may be unable to visually perceive real-world objects in the field of view due to visual obstruction by a display and/or other portions of a wearable computing device. For example, and with reference to FIG. 3B, a position 322 of equipment 320 may be detected by a simulation system. Position 322 may comprise a reference position of one or more sensors integrated with equipment 320. Position 322 may comprise a rotational position of equipment. Position 322 may comprise three degrees of freedom information. Position 322 is illustrated relative to image 310 in FIG. 3B; however, such an arrangement is provided for purposes of illustration and embodiments according to various aspects of the present disclosure may enable position 322 to be determined separately and/or independently from image 310. In embodiments, position 322 may comprise an anchor point for a position of equipment 320. Position 322 alone may lack six degrees of freedom information. For example, position 322 may lack translational position information indicative of a spatial location of equipment in three-dimensional space relative to a wearable computing device of a simulation system (e.g., simulation system 100 and/or simulation system 200 with brief reference to FIGS. 1-2).

In embodiments, equipment 320 may comprise a display 324. Display 324 may provide information regarding equipment 320 to a device comprising an image sensor. Display 324 may display a predetermined image. The predetermined image may indicate the information regarding equipment 320. For example, display 324 may display a serial number, device type, status information, or other information regarding equipment 320. Display 324 may provide indicia that enables a use and/or position of equipment 320 to be detected via image 310. In embodiments, display 324 may provide indicia that enables positional information separately provided by equipment to be confirmed by a wearable computing device or other device of a simulation system. For example, display 324 may provide a device identifier that enables a wearable computing device (e.g., wearable computing device 210) to confirm that an equipment from which position information is received is visible proximate a user. In embodiments, a simulation system may be configured to determine position 322 independent of any visual indicia provided by equipment. Position 322 may be determined independent of display 324 or any other visual information of equipment 324 (e.g., visual information corresponding to an appearance, shape, color, etc. of a housing of equipment 320) that may be included in image 310. In embodiments, position information from equipment 320 (i.e., equipment position information) indicating position 322 may be provided from equipment 320 to another device of a simulation system, such as a wearable computing device and/or a server computing device.

In embodiments, one or more devices of a simulation system may be configured to detect a position information of an object in an image. The object may be separate from an equipment. The object may be detected independent of any indicia added to the object. The object may comprise a non-instrumented object. For example, a first position information of a first non-instrumented object and/or a second position information of a second non-instrumented object may be detected in accordance with image 310. The first position information may comprise a first position of the first portion of the first non-instrumented object 330. The second position information may comprise a second position of the second portion of the second non-instrumented object 340.

In embodiments, position information of a non-instrumented object may comprise a spatial location of the non-instrumented object. The position information may comprise a three-dimensional position of the non-instrumented object. The position information may comprise a reference position associated with the non-instrumented object. The position information may comprise a translational position of the non-instrumented object. The position information may comprise a vertical position, a horizontal position, and/or a depth position of the non-instrumented object relative to an image sensor or other reference position. The position information may comprise three degrees of freedom information. The position information may be determined in accordance with image 310. The position information may depend on capture of the non-instrumented object in image 310. In embodiments, the position information may comprise a reference point indicative of a real-world position of the non-instrumented object. In embodiments, the position information may comprise an anchor point for a position of non-instrumented object. The anchor point may enable an image associated with one or more of equipment 320 and/or the non-instrumented object to be rendered in a simulated environment. The position information of non-instrumented object alone may lack six degrees of freedom information. For example, the position information of first non-instrumented object 330 may lack rotational position information indicative of a rotational position of first non-instrumented object 330 in three-dimensional space relative to a wearable computing device of a simulation system (e.g., simulation system 100 and/or simulation system 200 with brief reference to FIGS. 1-2). Alternately or additionally, the position information of the non-instrumented object may comprise six degrees of freedom information for the non-instrumented object, but lack six degrees of freedom information for an equipment located proximate the non-instrumented object. To obtain a spatial location and pose of the equipment, position information of the non-instrumented object and separately received position information regarding the equipment may be employed in embodiments according to various aspects of the present disclosure.

In embodiments, the first position information of first non-instrumented object 330 may comprise a position 332 of a portion of the first non-instrumented object 330. The portion may comprise a single portion of first non-instrumented object 330. For example, position 332 may comprise a position of a wrist of the user (e.g., wrist position). Position 332 may comprise a reference location a user's wrist represented in image 310. For example, 332 may comprise a center of a wrist captured in image 310. Position 332 may comprise a single reference position. Position 332 may comprise an anchor point for subsequently rendering an image associated with each of one of the first non-instrumented object 330 and/or equipment 320. Position 332 may be detected independent of other positions associated with the first non-instrumented object 330, including one or more positions 334 of other portions of the first non-instrumented object.

In other embodiments, the first position information of the first non-instrumented object 330 may comprise a plurality of positions 334 of one or more portions of first non-instrumented object 330. For example, first position information of first non-instrumented object 330 may comprise multiple positions 334 of multiple portions of first non-instrumented object 330. Each position of the multiple positions 334 may comprise a knuckle position. One or more positions of multiple positions 334 may correspond to a position of one or more fingers (pointer finger, index finger, thumb, etc.) of first non-instrumented object 330. In embodiments, position information of non-instrumented object 330 may comprise a single position selected among the group comprising position 332 or each position of multiple positions 334.

In embodiments, a first position information of a non-instrumented object may comprise a pose of the non-instrumented object. The pose may comprise spatial position and/or rotational position information of the non-instrumented object. For example, the first position information of first non-instrumented object 330 may comprise first pose 336. First pose 336 may comprise a plurality of positions. For example, first pose 336 may comprise two or more positions selected from the group comprising position 332 and multiple positions 334. In embodiments, first pose 336 may provide six degrees of freedom information regarding first non-instrumented object 330. In embodiments, a pose may enable status information regarding the non-instrumented object to be detected, in addition to a position of the non-instrumented object. For example, pose 336 may indicate whether equipment 320 is being held in a manner that enables predetermined use of equipment 320, such as pulling a trigger of equipment 320 to deploy a projectile from equipment 320. The additional information may enable intent of a user of equipment 320 to be determined (e.g., by being provided to intent detection module 238 with brief reference to FIG. 2). Alternately or additionally, pose 336 may enable proper usage of equipment 320 to be detected by a simulation system. Alternately or additionally, pose 336 may be used to detect a physical input comprising a gesture to be detected by a simulation system. Information regarding pose 336, including as it may relate to equipment 320, may be detected by the simulation system without requiring additional sensors to be disposed on equipment 320 or the non-instrumented object (e.g., first non-instrumented object 330).

In embodiments, position information may be detected for each non-instrumented object in an image. For example, a first position information may be detected for first non-instrumented object 330 and a second position information may be detected for second non-instrumented object 340 in image 310. The second position information may comprise a position 342 of a portion (e.g., wrist) of the second non-instrumented object 334. The second position information may comprise one or more of multiple positions 344 of second non-instrumented object 340. The second position information may comprise second pose 346 associated with two or more positions selected from the group comprising position 342 and multiple positions 344. In embodiments, second pose 346 may enable a physical input comprising a gesture of second non-instrumented object to be detected. For example, second pose 346 may indicate a stop gesture associated with second non-instrumented object.

In embodiments, a simulation system may be configured to render an equipment in a simulated environment in accordance with position information of the equipment and position information of a non-instrumented object. The rendered equipment may comprise a virtual equipment. The rendered equipment may comprise an image of the equipment. For example, and with reference to FIG. 3C, an image 350 comprising a simulated environment may be presented via a display in accordance with one or more user inputs received by a simulation state. Image 350 may be rendered via a display such as display 218 with brief reference to FIG. 2. Image 350 may correspond to a same field of view as image 310, further augmented with a virtual environment and one or more virtual objects in accordance with a training simulation. For example, a training simulation represented in image 350 may comprise a virtual environment 355 and virtual objects that include a first NPC 390, and a second NPC 395. An image (e.g., portion of image, animation, etc.) of such virtual objects may be determined in accordance with a simulation state among a plurality of simulation states of a training simulation (e.g., training scenario).

In embodiments, at least one of the virtual objects may represent a real-world object. For example, virtual equipment 360 may correspond to equipment 320, first virtual non-instrumented object 370 may correspond to first non-instrumented object 330, and second virtual non-instrumented object 380 may correspond to second non-instrumented object 340 with brief reference to FIGS. 3A-B. An image (e.g., portion of image, animation, etc.) of such virtual objects may be determined in accordance with position information associated with each respective real-world object. Virtual equipment 360 may comprise an image corresponding to equipment 320, first virtual non-instrumented object 370 may comprise an image corresponding to first non-instrumented object 330, and second virtual non-instrumented object may comprise an image corresponding to second non-instrumented object 340. The image and/or position of virtual first non-instrumented object 370 may be determined in accordance with position information detected for first non-instrumented object 330. For example, a position of first virtual non-instrumented object 370 may be located within image 350 in accordance with position 332 of first non-instrumented object 330 detected from image 310. The image and/or position of virtual second non-instrumented object 380 may be determined in accordance with position information detected for second non-instrumented object 340. For example, the image of second virtual non-instrumented object 380 may represent a stop gesture in accordance with second pose 346 of second non-instrumented object 340. In embodiments, and as further discussed below, the image and/or position of virtual equipment 360 may be determined in accordance with position information received from equipment 320 and position information detected for first non-instrumented object 330.

In various embodiments, a method comprising one or more operations for detecting equipment for a training simulation may be provided. For example, and with reference to FIG. 4, method 400 may comprise one or more of receiving configuration information identifying a non-instrumented object 410, detecting motion data of a headset 420, receiving equipment position information 430, capturing an image 440, detecting a non-instrumented object in an image 450, determining a position of an equipment relative to a non-instrumented object 460, or displaying an image of an equipment based on a position 470. Method 400 may be performed by one or more devices of a simulation system. For example, and with brief reference to FIGS. 1 and 2, one or more operations of method 400 may be performed by headset 100 and/or server 130 or wearable computing device 210 and/or server computing device 230.

In embodiments, and after starting, method 400 may comprise receiving configuration information identifying a non-instrumented object 410. The non-instrumented object may be a non-instrumented object with which an equipment may be used during a training simulation. For example, and with brief reference to FIG. 3B, the configuration information may indicate first non-instrumented object 330. The configuration information may indicate that equipment 320 may be used in a right hand of a user during a training scenario. The configuration information may be received prior to detecting a non-instrumented object in an image 450. The configuration information may be received prior to detecting position information of a non-instrumented object in the image. The configuration information may be received via a user interface of a device of simulation system. For example, the configuration information may be received via user interface 228 of equipment 220, a user interface 258 of trainer computing device 250, an input audio interface 211 of wearable computing device 210, an image sensor 213 of wearable computing device 210, a user interface comprising one or more actuatable elements (not shown) of wearable computing device 210, or combinations of two or more such elements. By receiving configuration information identifying the non-instrumented object, a user of a wearable computing device may be enabled to train using equipment 320 in a same manner they would during a real-world incident. In embodiments, the configuration information may identify a plurality of equipment and at least one non-instrumented object for each equipment of the plurality of equipment.

In embodiments, method 400 may comprise detecting motion data of a headset 420. The motion data may indicate movement of a user. For example, the motion data may indicate at least one of rotation of a user's head or movement of a user's body. The motion data may be detected via position sensors. For example, the motion data may be detected by position sensors 217 with brief reference to FIG. 2. The motion data may be provided to processor 212 to enable processor 212 to update an image of a simulation state presented via display 218.

In embodiments, method 400 may comprise receiving equipment position information 430. The equipment may comprise a conducted electrical weapon, a firearm, or a bola launcher. The equipment position information may comprise position information of the equipment at a point in time. The equipment position information may identify a position of the equipment. The equipment position information may comprise three degrees of rotational position information (e.g., roll, pitch, and yaw). The position may comprise a rotational position. The equipment position information may comprise pose information. For example, and with brief reference to FIG. 3B, the position information may indicate position 322. The equipment position information may be detected by equipment 320. The equipment position information may be received via a wireless connection between the equipment and another device of a simulation system. For example, equipment 220 may transmit equipment position information to wearable computing device 210 via wireless communication interface 226 and wireless communication interface 216 with brief reference to FIG. 2.

In embodiments, method 400 may comprise capturing an image 440. The image (i.e., captured image) may comprise an image in forward facing direction from a headset. The image may comprise a field of view oriented in direction opposite another direction in which a display of the headset is oriented. The image may comprise one image of a sequence of images (i.e., video data). The image may be captured by an imaging component integrated with a headset. For example, the image may be captured by one of camera 112 or image sensor 213 with brief reference to FIG. 1-2.

In embodiments, method 400 may comprise detecting a non-instrumented object in an image 450. The image may comprise the image generated in accordance with capturing an image 450. The non-instrumented object may comprise a part or portion of a body of a user. For example, the part of the body may comprise a wrist of the user. The part of the body may comprise one or more fingers of the user. In embodiments, the non-instrumented object may be detected by an object detection module configured to detect an object type of the non-instrumented object. For example, object detection module 219A may be configured to detect a wrist in an image, wherein first non-instrumented object 330 may comprise the wrist in the image.

In embodiments, detecting the non-instrumented object may comprise detecting position information of the non-instrumented object. The position information may comprise a position of a part of a body of the user. For example, the position information may indicate a position (e.g., position 332) of a wrist of a user, wherein the first non-instrumented object 330 may comprise the wrist. The position may comprise a physical position of the non-instrumented object in three-dimensional space. The position may comprise three degrees of translational position information associated with the non-instrumented object. For example, the position may indicate a lateral position, vertical position, and/or distance position of the non-instrumented object relative to an image sensor configured to an image sensor that captured the image in which the non-instrumented object was detected. In embodiments, the position may be relative to a reference position (e.g., plane, position, etc.) of the image sensor that captured the image in which the non-instrumented object was detected. In embodiments, the position information of the non-instrumented object may comprise a pose of the non-instrumented object. For example, the position information may comprise pose 336 of fingers of first non-instrumented object 330 with brief reference to FIG. 3B. In embodiments, the position information may be generated by an object detection module configured to detect the non-instrumented object. For example, object detection module 219A may be configured to detect a non-instrumented object and, in accordance with the detected non-instrumented object, generate position information indicating a position of the non-instrumented object.

In embodiments, method 400 may comprise determining a position of an equipment relative to a non-instrumented object 460. The position may comprise a relative position. The position of the equipment may be determined in accordance with received equipment position information and detected position information for the non-instrumented object. The position of the equipment relative to the non-instrumented object may comprise applying translational position information from the detected position information with rotational position information received from the equipment. Applying the translational position information to the rotational positional information may provide six degrees of freedom information for the equipment. An anchor point of the equipment position information may be determined to be proximate an anchor point of the position information of the non-instrumented object to determine the position of the equipment relative to the non-instrumented object. An anchor point of the equipment position information may be determined to be a default distance (e.g., three inches, less than six inches, etc.) away from an anchor point of the position information of the non-instrumented object to determine the position of the equipment relative to the non-instrumented object. An anchor point of the equipment position information may be determined to be a default direction (e.g., forward, away from the user, distal and above, etc.) from an anchor point of the position information of the non-instrumented object to determine the position of the equipment relative to the non-instrumented object. In embodiments, the position of the equipment relative to the non-instrumented object may be determined in accordance with configuration information previously received by a simulation system. The configuration information may indicate which non-instrumented object of a plurality of non-instrumented objects the equipment should be determined to be relatively positioned. For example, determining the position 460 may comprise determining position 322 to be proximate position 332 of first non-instrumented object 330 instead of position 342 of second non-instrumented object 340 with reference to FIG. 3B. Alternately, or additionally, the configuration information may indicate a relative position (e.g., distance and/or direction) between the non-instrumented object and the equipment. In embodiments, the relative position may be determined by an equipment position detection module configured to detect the relative position. For example, equipment position detection module 219B may be configured to detect the relative position. In embodiments, equipment position detection module 219B may be configured to receive position information for the non-instrumented object from the object detection module 219A. In embodiments, equipment position detection module 219B may be configured to receive equipment position information for the equipment from wireless communication interface 216.

In embodiments, method 400 may comprise displaying an image of an equipment based on a position 470. The image may comprise a default image of the equipment. Alternately or additionally, the image may be generated in accordance with the captured image. The image may be displayed in accordance with a relative position generated by determining the position of an equipment relative to a non-instrumented object 460. The image may be displayed on a display of a headset. For example, image 360 of equipment 320 may be displayed in image 350 presented via display 218 of wearable computing device 210 with brief reference to FIGS. 2 and 3C. One or more of a location and size of the image of equipment may be presented in an image in a display in accordance with the relative position generated by determining the position of an equipment relative to a non-instrumented object 460. For example, image 360 may be display in a right side of image 350 in accordance with a position information of position 332 of first non-instrumented object 330 being detected on a right side of image 310. In embodiments, the image may be displayed in accordance with motion data detected by the headset. For example, the motion data may indicate that a non-instrumented object 330 is positioned in a relative position on a right side of a field of view associated with an orientation of a headset indicated in the motion data. In embodiments, the motion data may indicate when the position of non-instrumented object is outside a field of view of a headset, in addition to or as an alternative to, an indication of position otherwise provided by an image sensor of the headset.

In embodiments, displaying the image may comprise displaying the image of the non-instrumented object. The image of the non-instrumented object may be displayed in accordance with the position of the non-instrumented object. For example, a position in position information for a first non-instrumented object 330 may cause image 370 of first virtual non-instrumented object to be displayed in a corresponding location within image 350. The image of the equipment may be displayed adjacent the image of the non-instrumented object via the head-mounted display. The image of the virtual non-instrumented object may comprise a default image. The image of the virtual non-instrumented object may be generated independent of the captured image. In other embodiments, the image of the virtual non-instrumented object may be generated in accordance with the captured image.

In embodiments, an image of an equipment (e.g., virtual equipment) or non-instrumented object (e.g., virtual non-instrumented object) may be presented in accordance with pose information. For example, the image may be rotated in accordance with the pose information. An image of virtual equipment 360 may be oriented in accordance with a pose indicated by position 322. Alternately or additionally, portions of the image may be generated in accordance with the pose. For example, an image of virtual second non-instrumented object 380 may comprise fingers positioned in accordance with pose 346. Accordingly, position information may modify where a virtual object (e.g., equipment or non-instrumented object) is displayed within an image of a simulated environment, as well as how the virtual object is displayed within the image of the simulated environment.

In embodiments, receiving the equipment position information 410 may further comprise receiving, via the wireless network interface, status information regarding the equipment. The status information may comprise non-position related information. For example, the status information may be associated with one or more of a safety switch of the equipment, an activation trigger of the equipment, and a cartridge of the equipment. In embodiments, a simulation state of a training simulation may be changed in accordance with the status information. Alternately or additionally, an image of the equipment may be displayed in accordance with the status information. For example, status information indicating a safety of equipment 320 has been moved from an ON position to an OFF position may, in accordance with displaying an image 470, enable a virtual safety switch in an image of virtual equipment 360 to also be presented in an OFF position, thereby further enabling a simulated environment to accurately represent a physical input provided by a user.

In various embodiments, a virtual reality headset may be provided. The headset may comprise a display, wireless network interface, camera, a processor, and non-transitory computer-readable storage media storing instructions that, when executed by the processor, cause the headset to perform one or more operations recited herein.

In various embodiments, computer-readable storage media may be provided. The computer-readable storage media may store instructions that, when executed by a processor of a wearable computing device, cause the wearable computing device to perform one or more operations recited herein.

In various embodiments, a virtual training system may be provided. The virtual training system may comprise a simulation system. The virtual training system may comprise a VR-based training system. The virtual training system may comprise a wearable computing device comprising a display, wireless network interface, camera, a processor, and a non-transitory computer-readable storage media storing instructions that, when executed by the processor, cause the wearable computing device to perform one or more operations recited herein; and an equipment comprising a wireless communication interface in configured to transmit equipment position information to the wearable computing device. The virtual training system may further comprise a server computing device comprising a network interface, a second processor, and a second non-transitory computer-readable storage media storing instructions that, when executed by the second processor, cause the second processor to perform one or more operations disclosed herein.

Simulation systems may generate virtual overlays to provide input options to a user during a course of a training simulation. However, such overlays may disrupt a realism of the training simulation and fail to replicate a real-world incident. Such overlays may provide an inefficient manner of controlling the simulation system, particularly in view of the various user inputs that a user may be able to provide. Such overlays may also artificially limit a manner in which a user may provide a user input, fail to account for the rich variety of user inputs that a user may otherwise provide in a given simulation state of a training scenario. For example, such overlays may fail to enable a simulation system to receive and process a substantial variety of words and tones that may be provided via an audio input of a user input. Embodiments according to various aspects of the present disclosure address these technical disadvantages of simulation systems, including as further discussed below.

In various embodiments, a simulation system may be controlled using various user inputs. The various user inputs may enable a simulation system to respond to a user in a more natural, intuitive manner. The various user inputs may enable a user to practice using various manners of communication available during a real-world incident. For example, a user may be able to vocally interact with another person during a real-world incident, as well as physically interact with the other person.

Figure 5:
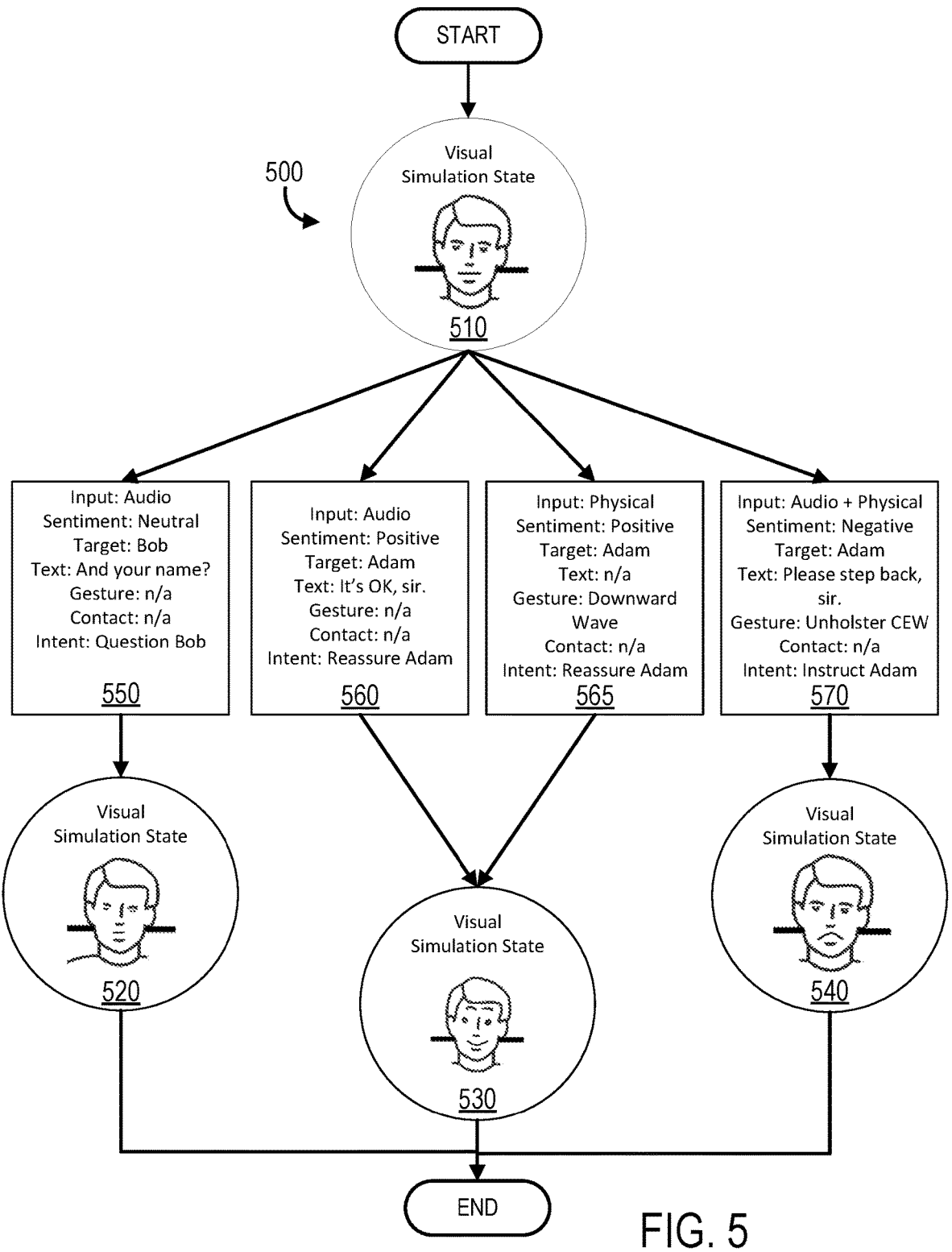
FIG. 5 illustrates a schematic diagram for controlling a simulation system via user input in accordance with various embodiments described herein.

In embodiments, and with reference to FIG. 5, a simulation system may be configured to present a training simulation comprising a plurality of simulation states. The plurality of simulation states may correspond to different arrangement of virtual objects that may be encountered as selective playback of a training simulation is provided. Each simulation state of the plurality of simulation states may be associated with different audio and/or visual content. For example, each simulation state may be associated with a different image (e.g., image 350 with brief reference to FIG. 3C) presented via a display (e.g., display 218 with brief reference to FIG. 2). Alternately or additionally, each simulation state may be associated with a different audio output provided via an audio output interface (e.g., output audio interface 215 with brief reference to FIG. 2). In embodiments, changing a simulation state may comprise providing audio, visual, and/or audiovisual content associated with a different simulation state relative to a simulation state currently being presented. Each of changing the simulation state and updating the simulation state may be performed in accordance with a user input.

In embodiments, a simulation state (i.e., simulated environment) may comprise a virtual environment. The virtual environment may comprise one or more stationary virtual objects. The virtual environment may comprise non-interactive objects. The virtual environment may present one or more boundaries that limit virtual movement of a user wearing a headset. The virtual environment may be represented in an image associated with the simulation state. The virtual environment may comprise one or more images and/or virtual locations that enable the virtual environment to be presented in an image. For example, and with brief reference to FIG. 3C, image 350 may comprise virtual environment 355. Virtual environment 355 may comprise one or more virtual walls, doorways, furniture, ceilings, plants, roads, or other fixed virtual objects representative of a built or non-built environment in which a training simulation may be predetermined to occur. A visual and/or audible output associated with a virtual environment may be predetermined and unmodified in accordance with a user input.

In embodiments, a simulation state may comprise a virtual object. The virtual object may comprise an interactive object. The virtual object may comprise a non-stationary object. For example, the virtual object may be self-propelled and/or moveable in a simulation state in accordance with a user input. The virtual object may be presented within (e.g., relative to) a virtual environment. The virtual object may be associated with one or more virtual locations within the virtual environment. For example, the virtual object may be assigned a three-dimensional space within a virtual environment in accordance with a simulation state. The virtual object may be associated with one or more images configured to represent the virtual object in the simulation state. The virtual object may be associated with one or more animated images (e.g., animations) configured to represent the virtual object in the simulation state. The virtual object may comprise one or more audio outputs associated with a simulation state. For example, a virtual object may comprise a set of audio outputs designated for a given simulation state, wherein each audio output may provide a dialogue that may be spoken by the virtual object in accordance with the simulation state. The virtual object may comprise a virtual living object (e.g., person, dog, cat, etc.) or a virtual non-living object (e.g., door, window, driver's license, weapon, etc.). In embodiments, a simulation state may comprise a plurality of virtual objects. For example, and with brief reference to FIG. 3C, image 350 of a simulation state may comprise a first virtual object of first NPC 390 ("Adam") and a second virtual object of second NPC 395 ("Bob"). Each virtual object 390,395 may comprise a virtual person in accordance with a simulation state of training simulation.

In embodiments, a virtual object comprising a virtual person may comprise various features presented in accordance with a simulation state. For example, the virtual person (i.e., NPC) may comprise a virtual position. The virtual position may be selected relative to a viewpoint of a user in accordance with the simulation state. For example, a first simulation state may comprise a virtual position for a virtual person that appears to be remote from the viewpoint of the user (e.g., virtual position of the user), while a second simulation state may comprise another virtual position for the virtual person that is proximate (e.g., closer than the remote position) the viewpoint of the user. As an alternate or additional example, the virtual person may comprise a level of animation. A level of animation may correspond to a manner in which the virtual person is presented in the simulation state. A level of animation may range from a high level to a low level. The level of animation may range from an active (e.g., high, aggressive, etc.) level of animation to a passive (e.g., low, calm, non-aggressive, inactive, etc.) level of animation.

In embodiments, a level of animation may affect a set of audio outputs that may be emitted by the virtual person. For example, a virtual person comprising a low level of animation may be configured to emit an audio output associated with a first set of audio outputs, while the virtual person having a high level of animation may emit an audio output associated with a second set of audio outputs. The second set may comprise fewer audio outputs. The second set may comprise dialogue with more offensive words than the first set.

Alternately or additionally, the level of animation may affect a speed of animation of the virtual person. For example, a virtual person comprising a low level of animation may be visually represented in a sequence of images for a simulation state to be tapping their foot slowly. A virtual person comprising a high level of animation may be visually represented in a sequence of images for a simulation state to be tapping their foot at rapidly. The virtual person may twitch, flex, speak, pace, or perform other simulated movements in accordance with a level of animation.

Alternately or additionally, the level of animation may affect a volume of speaking associated with a virtual person. For example, a virtual person comprising a low level of animation may be associated with playback of an audio output at a low volume (e.g., loudness), while a virtual person comprising a high level of animation may be associated with playback of an audio output at a high volume louder than the low volume.

Alternately or additionally, the level of animation may affect a facial expression selected for a virtual person. For example, a virtual person comprising a low level of animation may be associated with a neutral facial expression. The neutral expression may comprise a neutral expression for a given emotional state (e.g., angry, sad, fearful). A virtual person comprising a high level of animation may be associated with a non-neutral facial expression. The non-neutral facial expression may visually express the given emotional state. In embodiments, the emotional state may be selected in accordance with the simulation state. For example, a virtual person may be presented as angry in a first simulation state and sad in a second simulation state of a plurality of simulation states. In embodiments, the emotional state may be further represented in other features by which the virtual person is represented in the simulation state, including the sets of audio outputs that may be presented in association with the virtual person.

In embodiments, a feature of a virtual object may comprise an emotional state. The emotional state may affect a manner in which a visual output and/or audio output associated with the virtual object may be generated in a simulated environment. For example, the emotional state may comprise one of anger, disgust, calmness, fear, sadness, anxiety, confusion, or joy. Between different sequential simulation states, the emotional state of the virtual object may be different or same.

In embodiments, a feature of a virtual object may comprise an orientation. The orientation may be configured to cause a predetermined portion of the virtual object to be facing a predetermined direction in a virtual environment. The predetermined portion of a virtual object comprising an NPC may comprise a virtual face of the NPC. For example, an orientation of an NPC may be directed toward a viewpoint of the user, away from the viewpoint of the user, and/or toward another NPC. The orientation may be determined in accordance with a simulation state currently being presented.

Embodiments according to various aspects of the present disclosure enable control of a simulation state via a user input. The user input may be indeterminate. For example, a specific, required form of user input may not be predetermined. Rather, and including as further discussed below, an intent may be associated with a user input may be determined to enable a range and variety of user inputs to control the simulation state. In embodiments, the user input may comprise an audio input, a physical input, or a combination of audio input and physical input. The audio input of the combination may be a same or different user input relative to a user input comprising the audio input alone. The physical input of the combination may be a same or different user input relative to a user input comprising the physical input alone. Different user inputs may cause same or different changes to the simulation state. Different user inputs may cause same or different updates to a current simulation state. Such an arrangement may enable differences between input interfaces (e.g., higher or lower quality microphones, responsive or less responsive position sensors in equipment, etc.) to cause same or different changes or updates to a simulation state. Such an arrangement may enable differences between users (e.g., different accents, different expressions of greeting, etc.) to cause same or different changes or updates to a simulation state. Accordingly, the embodiments according to various aspects of the present disclosure enable integration of a simulation system with a variety of technical devices and/or users.

In embodiments, different user inputs may be received relative to a simulation state. The user inputs may cause same or different changes to the simulation state. A simulation state may comprise a set of values that may be interpreted by a simulation system to present a simulated environment to a user. For example, the simulation state may comprise a set of values from memory 214 interpreted by processor 212 to render an image (e.g., image 350) via display 218 with brief reference to FIGS. 2 and 3C. A change to a simulation state may comprise a change from a current simulation state to one of a plurality of different simulation states in accordance with a user input. For example, and in accordance with FIG. 5, a training simulation 500 may comprise a first simulation state 510, a second simulation state 520, a third simulation state 530, and a fourth simulation state 540. Each simulation state may comprise a same virtual object. Each of the plurality of simulation states 510-540 may comprise an associated visual output. The visual output may be associated with a virtual object. For example, and with brief reference to FIG. 3C, each of the plurality of simulation states 510-540 may comprise first NPC 390, which may also be referred to as "Adam". Accordingly, first simulation state 510 may comprise a first visual simulation state in which a visual output representing Adam may be presented via a display, second simulation state 520 may comprise a second visual simulation state in which a visual output representing Adam may be presented via the display, third simulation state 530 may comprise a third visual simulation state in which a visual output representing Adam may be presented via the display, and fourth simulation state 540 may comprise a fourth visual simulation state in which a visual output representing Adam may be presented via the display.

In various embodiments, Adam may have different features in accordance with each simulation state. For example, Adam may be disposed at a first position within a virtual environment and/or have a first level of animation (i.e., animation level) in accordance with first simulation state 510. Adam may be disposed at a second position within the virtual environment and/or have a second level of animation in accordance with second simulation state 520. The features in accordance with the first simulation state 510 may be different from the second simulation state 520. For example, a virtual position of Adam relative to a viewpoint of the user may be farther away in the simulation state 520 relative to the first simulation state 510. Alternately or additionally, an animation level of Adam may be lower in the simulation state 520 relative to the first simulation state 510. Adam may further be presented in accordance with third features in third simulation state 530 and fourth features in fourth simulation state 540. The third features may be same or different relative to respective corresponding features of first simulation state 510 and second simulation state 520. The fourth features may be same or different relative to respective corresponding features of first simulation state 510, second simulation state 520, and third simulation state 530. Presenting the features via a display may involve accessing different image data and/or audio data for the virtual object of Adam. For example, and with brief reference to FIGS. 2 and 3C, processor 212 may access first image data and first audio data from memory 214 to present first NPC 390 in first simulation state 510 and second image data and second audio data from memory 214 to present first NPC 390 in a second simulation state 520.

In embodiments, a simulation system may be controlled in accordance with different user inputs. For example, and with reference to FIG. 5, first user input 550, second user input 560, third user input 565, and fourth user input 570 may be received when the simulation system is disposed in first simulation state 510. Each user input 550-570 may be detected by the simulation system and, in accordance with the respective user input, cause first simulation state 510 to change to a same next simulation state or different simulation state relative to another simulation state. While only one user input may be received while the simulation state is executed in first simulation state 510, each of the different user inputs 550-570 may have an associated simulation state to which first simulation state 510 may be changed. For example, first user input 550 may cause first simulation state 510 to change to second simulation state 520, second user input 560 may cause first simulation state 510 to change to third simulation state 530, third user input 565 may cause first simulation state 510 to change to third simulation state 530, and third user input 570 may cause first simulation state 510 to change to fourth simulation state 540. Accordingly, each of first user input 550 and fourth user input 570 may cause first simulation state 510 to change to a different respective simulation state relative to other user inputs. Despite being different user inputs, second user input 560 and third user input 565 may cause first simulation state 510 to change to a same simulation state (e.g., third simulation state 530). In embodiments, another user input (not shown) may cause the simulation system to be updated and/or remain in first simulation state 510, rather than changing to a different simulation state relative to first simulation state 510.

In embodiments, user inputs 550-570 may be different. For example, first user 550 may comprise an audio input (e.g., audio only input). First user input 550 may comprise, for example, an audio input received via input audio interface 211 with brief reference to FIG. 2. First user input 550 may further comprise, for example, a lack of physical input received via one or more position sensors of an equipment in contact with wearable computing device 210 with brief reference to FIG. 2. For example, first user input 550 may be received in accordance with a lack of position information or status information being received via user interface 228 of equipment 220 with brief reference to FIG. 2. A physical input may not be received during a period of time in which the audio input of first user input 550 is received.

In embodiments, and in contrast with first user input 550, third user input 565 may comprise a physical input (e.g., physical input only). Third user input 565 may lack (i.e., exclude), for example, an audio input received via input audio interface 211 with brief reference to FIG. 2. Third user input 565 may further comprise a physical input received via one or more position sensors of an equipment in contact with wearable computing device 210 with brief reference to FIG. 2. For example, third user input 565 may be received in accordance with a position information or a status information being received via user interface 228 of equipment 220 with brief reference to FIG. 2. Alternately or additionally, the physical input of third user input 565 may comprise a physical input detected in accordance with an image captured via an image sensor of the system. For example, a non-instrumented object comprising apart of a user (e.g., hand, fingers, etc.) may be detected as the physical input of third user input 565. An audio input via an input audio interface of the simulation system may not be received during a period of time in which the physical input of third user input 565 is received.

In embodiments, and in contrast with first user input 550 and third user input 565, fourth user input 570 may comprise a physical input and an audio input. Fourth user input 570 may include an audio input received via input audio interface 211 and a physical input received via one or both of user interface 228 of equipment 220 and/or image sensor 213 with brief reference to FIG. 2. Both the audio input and the physical input may be detected during a same period of time to receive fourth user input 570.

In embodiments, a user input received by a simulation system may be analyzed. For example, processor 212 of wearable computing device 210, independently or in combination with one or more local or remote modules, may be configured to analyze a user input received while simulation system 200 is executed in first simulation state 510. The user input may be analyzed for different factors. For example, the user input may be analyzed for factors comprising text information, target information, sentiment information, gesture information, and/or contact information in accordance with user input. In embodiments, the user input may include or not include such factors. Analyzing the user input may comprise providing the user input to one or more modules configured to detect one or more factors of the different factors. Analyzing the user input may comprise separating a portion of the user input for processing by the one or more modules. In embodiments, analyzing the user input may comprise performing an analysis on the user input for a factor, independent of whether the factor is detected in the user input.

In embodiments, different user inputs may comprise different detected factors. For example, first user input 550 may comprise a sentiment information of neutral, a text associated with a question, and a target of a second virtual object (e.g., NFC 395 or "Bob" with brief reference to FIG. 3C). Other factors, such as a contact between a virtual user position and a virtual object and a gesture, may not be detected in accordance with an analysis of first user input 550. In embodiments, second user input 560 may comprise a sentiment information of positive, a text associated with a statement, and a target of a first virtual object (e.g., Adam). Other factors may not be detected in accordance with an analysis of second user input 560. In embodiments, third user input 565 may comprise a sentiment information of positive, a target of Adam, and a gesture of a downward wave. Other factors may not be detected in accordance with an analysis of third user input 565. In embodiments, fourth user input 570 may comprise a sentiment information of negative, a text associated with a statement, and a target of Adam, a gesture of unholstering a CEW, but no contact. Accordingly, analysis of different user inputs may detect or not detect each of one or more factors of a given user input of the different user inputs.

In embodiments, a user input may be analyzed to detect an intent. The intent may be detected based at least in part on one or more factors of the user intent. In embodiments, an intent may indicate an intended function or result of the user input. The intent may comprise an action. The intent may comprise a target. In embodiments, a different intent may be detected in accordance with different inputs. For example, first user input 550 may be detected by a simulation system to comprise a first intent and fourth user input 570 may be detected by the simulation system to comprise a fourth intent different than the first intent. As an example, the first intent may comprise questioning a second virtual object and the fourth intent may comprise instructing a first virtual object in first simulation state. As another example, first user input 550 and second user input 560 may also be determined to comprise different inputs, despite both inputs comprising respective audio inputs.

Alternately or additionally, different user inputs may be determined to comprise a same intent. For example, second user input 560 may be detected to comprise a second intent and third user input 565 may be detected to comprise the second intent. The second intent may comprise, for example, reassuring a first virtual object of first simulation state. The second intent may be detected despite the second user input 560 comprising audio input and third user input 565 comprising physical input.

In accordance with a difference in factors and/or intent, a next simulation state among simulation states 520-540 may be selected. Selecting the next simulation state may comprise comparing the factors and/or intent with predetermined factors and/or factors. The predetermined factors and/or intent may be associated with a respective simulation state. For example, each of simulation states 520-540 may comprise different predetermined factors and/or intent. Selecting the next simulation state may comprise determining the received user input comprises the predetermined factors and/or intent. When a comparison indicates matching factors and/or intent for a given simulation state, the given simulation state may be selected as the next simulation state.

In embodiments, selecting a next simulation state may comprise applying a different set of features to a virtual object in accordance with the next simulation state. For example, and in accordance with features for first NFC 390 in second simulation state 520 relative to first simulation state 510, a level of animation of Adam may decrease, a virtual position may be maintained, and an emotional state may change from anxiety to sadness. As another example, and in accordance with features for first NFC 390 in third simulation state 530 relative to first simulation state 510, a level of animation of Adam may increase, a virtual position may increase to be further away from a viewpoint of the user, and an emotional state may change from anxiety to appreciation. As another example, and in accordance with features for first NFC 390 in fourth simulation state 540 relative to first simulation state 510, a level of animation of Adam may be maintained, a virtual position may decrease such that Adam is visually presented closer to the user in the simulated environment, and an emotional state may change from anxiety to anger. In embodiments, an audible and/or visual representation of Adam may be controlled to reflect the next simulation state. After the next simulation state is selected, an additional user input may be received, and analysis of the additional user input may be performed in accordance with repeated use of one or more operations disclosed herein.

Figure 6:
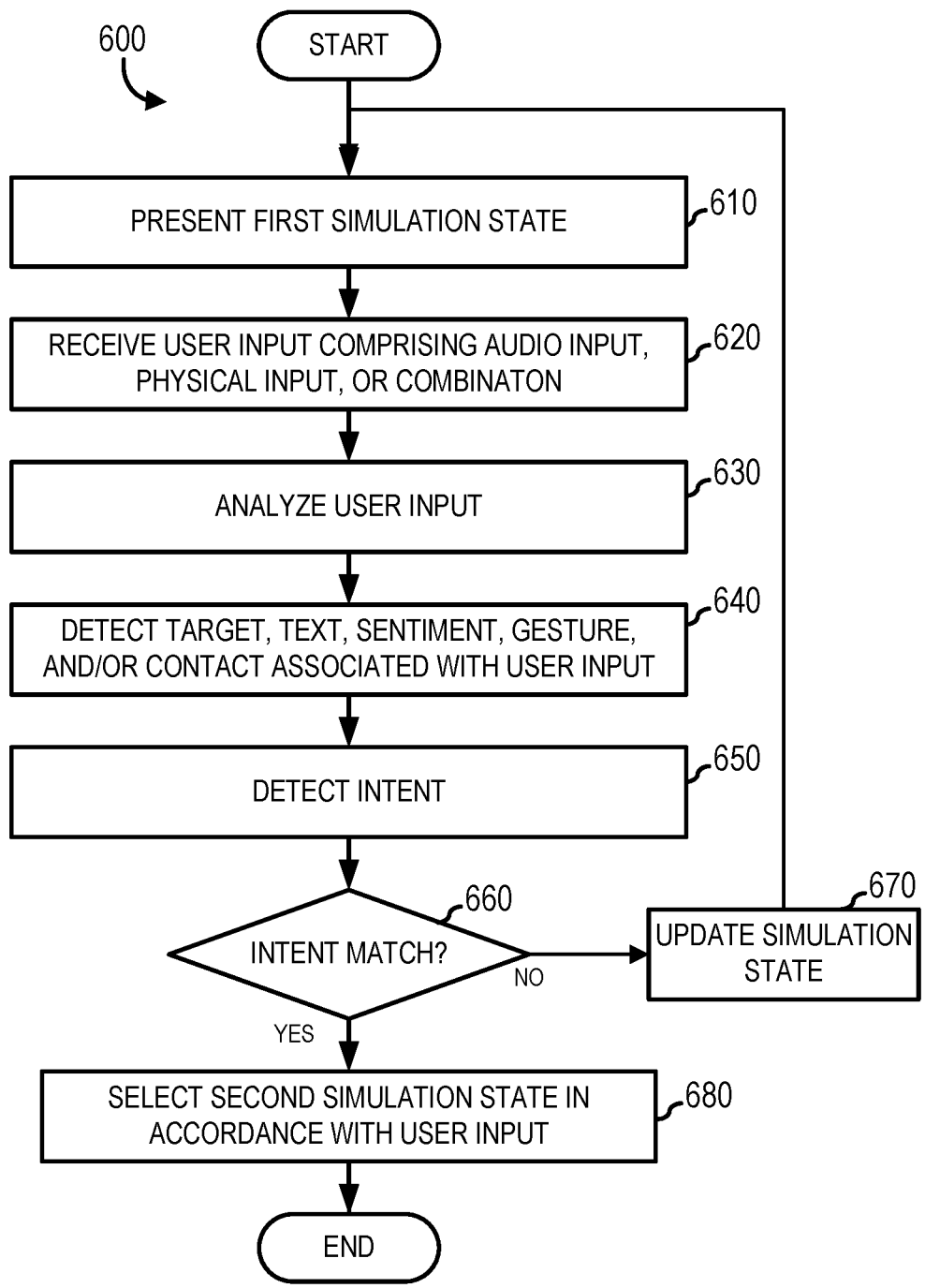
FIG. 6 illustrates a method of controlling a simulation system in accordance with various embodiments described herein.

In embodiments, methods of controlling a simulation system in accordance with different user inputs may be provided. For example, and with reference to FIG. 6, method 600 of controlling a simulation system in accordance with different user inputs may comprise presenting a first simulation state 610, receiving a user input 620, analyzing a user input 630, detecting factors of a user input 640, detecting an intent 650, matching an intent 660, updating a simulation state 670, and/or selecting a second simulation state in accordance with user input 680. Method 600 may be performed by one or more devices of a simulation system. For example, and with brief reference to FIGS. 1 and 2, one or more operations of method 600 may be performed by headset 110 and/or server 130 or wearable computing device 210 and/or server computing device 230.

Figure 3A:
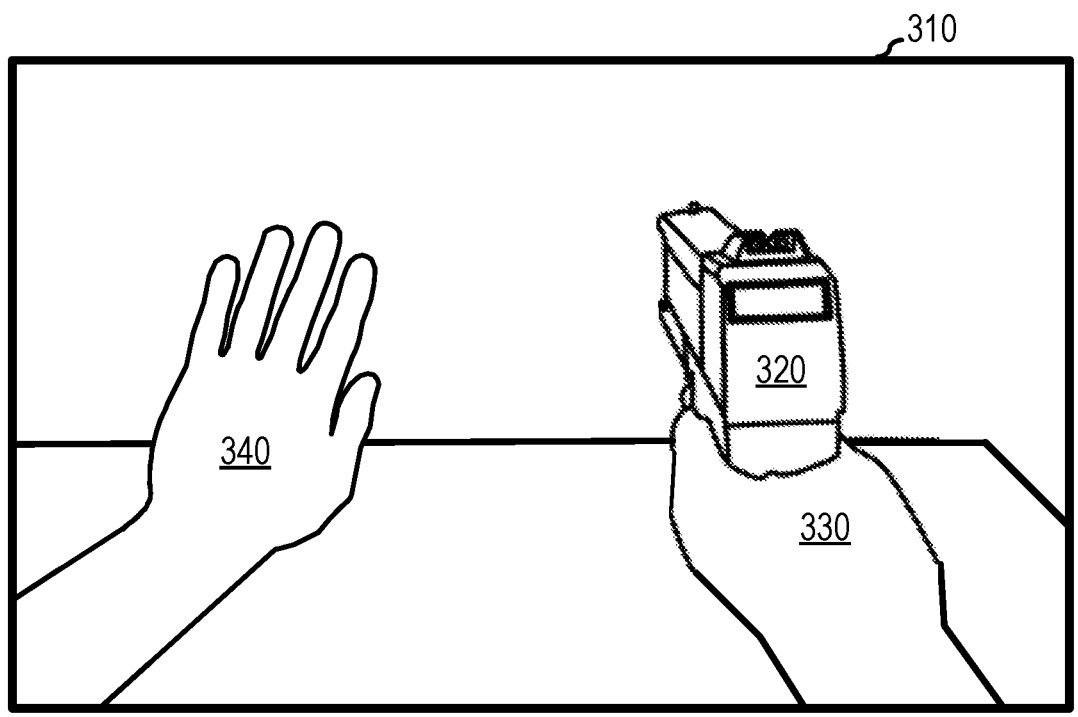
FIG. 3A illustrates image data captured by a simulation system, in accordance with various embodiments described herein.
Figure 3B:
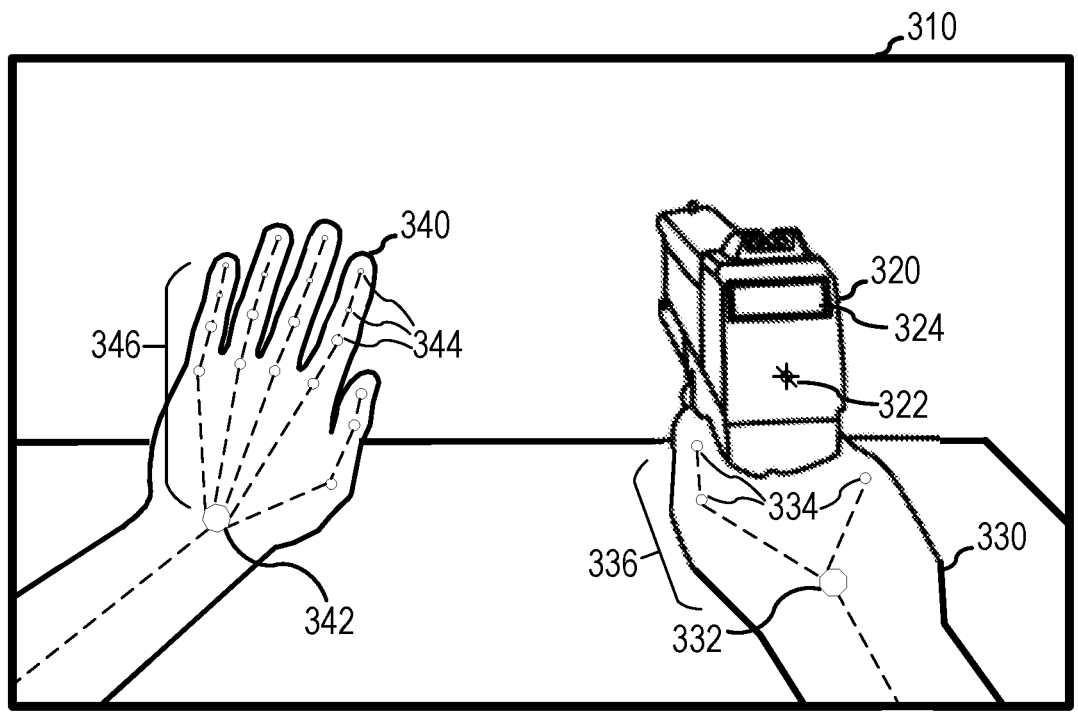
FIG. 3B illustrates image data analyzed by a simulation system, in accordance with various embodiments described herein.
Figure 3C:
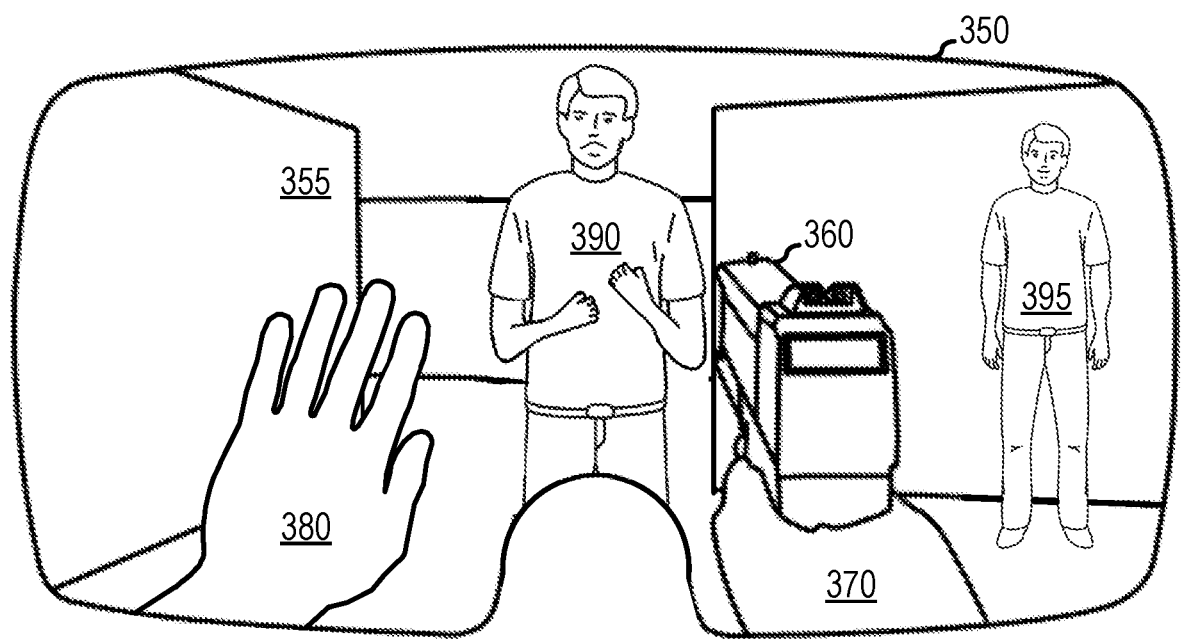
FIG. 3C illustrates a display of a wearable computing device of a simulation system, in accordance with various embodiments described herein.
Figure 4:
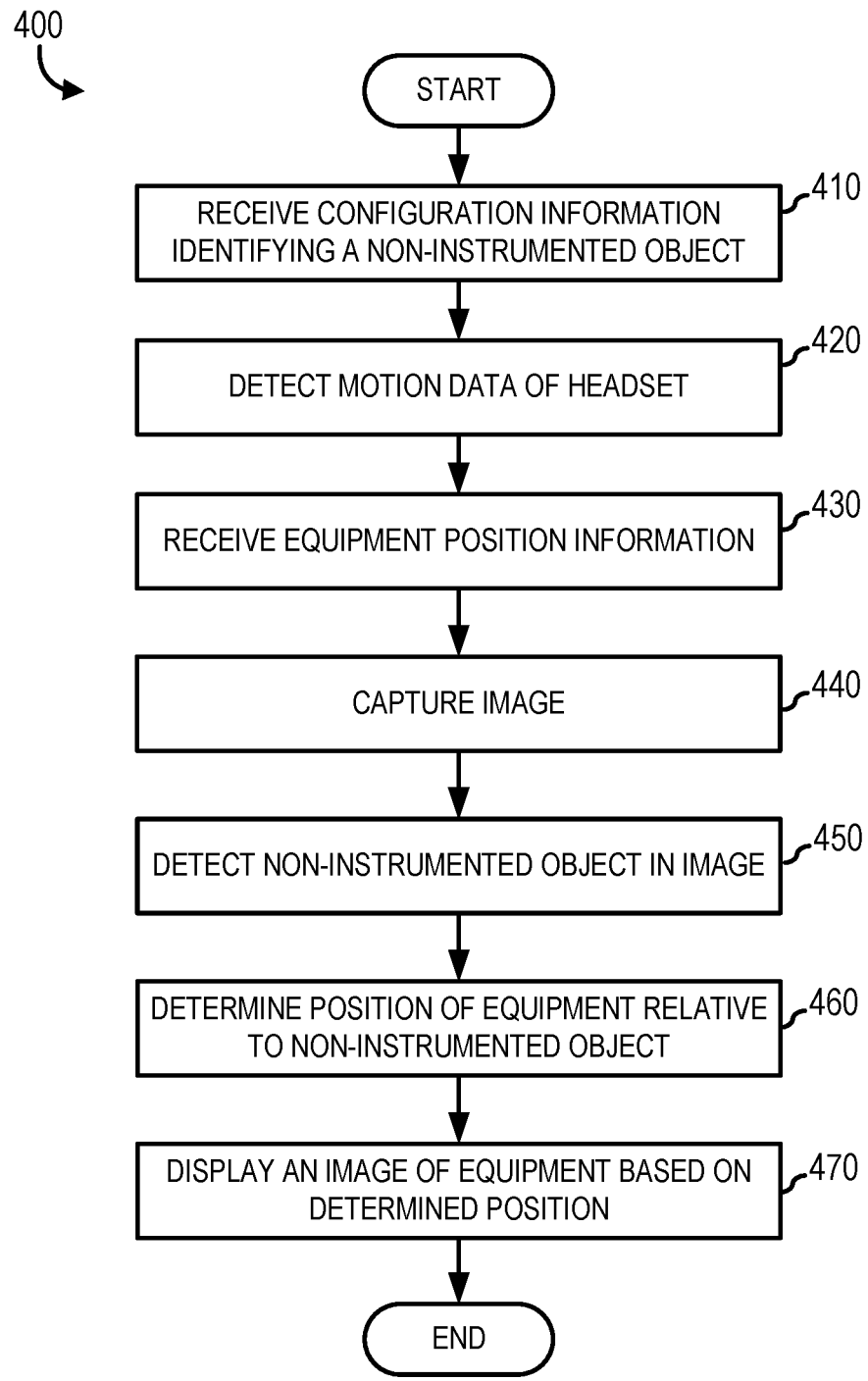
FIG. 4 illustrates a method of detecting equipment in accordance with various embodiments described herein.

In embodiments, and after starting, method 600 may comprise presenting a first simulation state 610. The first simulation state may be a first simulation state of a plurality of simulation states. The plurality of simulation states may comprise a plurality of simulation states of a training simulation (e.g., training scenario). Each state of the plurality of simulation states may comprise a visual simulation state. Each state of the plurality of simulation states may comprise a different simulation state. The first simulation state may be presented via a headset of a simulation system. For example, the first simulation state may be visually presented via a display of a headset of a virtual-reality-based simulation system (e.g., virtual reality system). Presenting the simulation state may comprise rendering a virtual environment and one or more virtual objects. For example, and with brief reference to FIG. 3C, presenting a simulation state may comprise rendering image 350 that comprises virtual environment 355, a first virtual object of first NPC 390, and a second virtual object of second NPC 395.

In embodiments, a virtual environment may be rendered in accordance with a number of variables. The variables may affect one or more visual features of a simulation state and/or audible features of the simulation state. For example, such variables may comprise a location, a time, a day, and weather, of the virtual environment. In embodiments, a plurality of simulation states of a training scenario may be rendered in accordance with a same set of such variables.

In embodiments, a virtual object may be rendered in accordance with the first simulation state. For example, a virtual object comprising an NPC may be included in a training scenario. Each simulation state of the training scenario may respectively indicate one or more of an image selected for the virtual object, a location within a virtual environment at which the virtual object may be positioned, an orientation of a predetermined portion of the virtual object, and an activity level for the virtual object. Such features may be same or different between virtual objects. In embodiments, each simulation state may comprise an audiovisual simulation state, wherein the virtual object may be rendered in accordance with both visual features and audible features in accordance with a respective simulation state. The audio features may comprise a set of sounds that may be selectively played back (e.g., output) to a user during the simulation state. The set of sounds may comprise, for example, sounds of different lines of dialogue (e.g., script) of the virtual object that may be output for the virtual object in accordance with the simulation state. In embodiments, the audio features may further comprise a volume level, speech rate, and repetition rate. In embodiments, presenting the audible features may be further determined in accordance with a combination of features for the simulation state. For example, in accordance with an animation level of the virtual object in the simulation state, a sound may be generated at a higher or lower volume, higher or lower speech rate (e.g., rate at which sounds of words is played back), and an increased or decreased repetition rate. For example, a line of dialogue may not be repeated for a given simulation state in accordance with a low animation level, or alternately, be repeated at shorter intervals in accordance with an increasing animation level. With brief reference to FIG. 3C, presenting the first simulation state 610 may comprise rendering first NPC 390 in accordance with a first set of features for a first simulation state and rendering second NPC 395 in accordance with a second set of features for the first simulation state. With brief reference to FIG. 2, a simulation state may be rendered processor 212 in accordance with information (e.g., features, factors, variables, etc.) stored in memory 214 to display an image of the simulation state via display 218 and emit audio outputs of the simulation state via audio output interface 215.

In embodiments, method 600 may comprise receiving a user input 620. The user input may be received over a period of time. The user input may correspond to a positive action of a user, such as speaking, moving their body, or interacting with an equipment. In embodiments, the user input may be detected via a wearable computing device, an equipment, and/or a combination of a wearable computing device and equipment.

In embodiments, receiving the user input 620 may comprise receiving an audio input. The audio input may comprise sounds of words spoken by the user. For example, an audio input may comprise a question asked by a user. The audio input may be received via a microphone of a headset. For example, an audio input of a user input may be received via input audio interface 211 of wearable computing device 210 with brief reference to FIG. 2.

In embodiments, receiving the user input 620 may comprise receiving a physical input. The physical input may be associated with a physical movement of a user's body as detected by a simulation system. For example, a user may wave, point, or make other gestures with their hand in the real-world and the simulation system may detect the gesture as a physical input for the simulation system. The physical input may be separate from an audible input (e.g., audio input) detected by the simulation system from the user.

In embodiments, the physical input may be received via an equipment of the VR system. For example, and with brief reference to FIG. 2, equipment 220 may detect actuation of a control and/or position sensor of equipment 220 via user interface 228. Equipment 220 may further transmit information (e.g., position information, status information, etc.) associated with the physical input to wearable computing device via wireless communication interface 226.

In embodiments, the physical input may be received via an image sensor of a simulation system. The image sensor may capture an image in which a portion of the user is represented. The image may be processed to detect the portion of the user in the image. For example, an object detection module may be configured to receive image data (e.g., an image, sequence of images of video data, etc.) and, in accordance with capture of one or more body parts of a user in the image data, generate position information identifying each body part of the one or more body parts. In embodiments, the position information may comprise position of the body part as captured in the image data. In embodiments, the position information may comprise a pose of the body part as captured in the image data. In embodiments, information regarding a physical input may comprise a gesture associated with a predetermined pose and/or one or more poses over a period of time. For example, and with brief reference to FIG. 2, wearable computing device 220 may detect a physical input comprising a position of a user's body in an image captured by image sensor 213. Object detection module 219A may be further applied to the captured image to detect the physical input. In embodiments, object detection module 219A and/or other detection modules of simulation system 200 may be implemented on another computing device, such as server computing device 230. The detected physical input (e.g., information regarding the detected physical input) may be further provided to other components of wearable computing device 220 and/or server computing device 230, thereby enabling a simulation state presented by simulation system 200 to be changed or updated in accordance with the physical input.

In embodiments, receiving the user input 620 may comprise receiving a combination of an audio input and a physical input. The combination may comprise an audio input and a physical input received at a same time. For example, a user input may comprise a sound of a reassuring sentence at a same time a downward wave is detected. The audio input and physical input may be detected via same interfaces for an audio input alone and a physical input alone as discussed above. The audio input and physical input may be detected as the combination in accordance with the audio input and physical input being received at a same time or at least partially at a same time. In embodiments, audio input and physical input may be detected as the combination in accordance with being received in sequence.

In embodiments, different sequences of user inputs may be received. A type of user input may be followed by another type of user input that is different or same as the type of user input. For example, an audio input may be received after another audio input. Alternately or additionally, an audio input may be received prior to a physical input or a combination of physical input and audio input being received. For example, first simulation state 510 of FIG. 5 may be applied in accordance with a received physical input, but subsequently, an audio input, physical input, or combination of the audio input and the physical input may be received to change first simulation state 510 to another simulation state 520-540. Accordingly, embodiments according to various aspects of the present disclosure enable an intuitive, flexible, natural and variety of user inputs to flexible control a training simulation to progress through different predetermined states of the training simulation.

In embodiments, method 600 may comprise analyzing a user input 630. Analyzing the user input 630 may enable the user input to be subsequently used to change or update a simulation state. Analyzing the user input 630 may comprise applying the user input to one or more detection modules. The one or more detection modules may be implemented on a same or different device at which the user input is received. For example, at least one detection module may be implemented on a server computing device remotely located from a VR headset. Alternately or additionally, at least one detection module may be implemented on the VR headset. Analyzing the user input 630 may comprise separating portions of the user input and/or providing one or more portions of the user input to different computing devices of a simulation system.

In embodiments, method 600 may comprise determining an intent in accordance with the user input. Determining the intent may comprise various operations, including detecting factors of a user input 640 and detecting an intent 650 with brief reference to FIG. 6.

In embodiments, method 600 may comprise detecting factors of a user input 640. The factors may comprise one or more factors. The factors may be detected from the user input. The factors may classify the user input into predetermined categories. The factors may quantify aspects of the user input. In embodiments, the factors may be detected by one or more modules configured to detect at least one factor of the factors. In embodiments, the factors may comprise one or more selected from the group comprising a text, a sentiment, a gesture, a contact, and a target of the user input. For example, and with brief reference to FIG. 5, a first user input 550 may comprise an audio input comprising a sentiment, a target, and text.

In embodiments, detecting factor of the user input 640 may be performed in accordance with a type of user input. For example, text may be detected in accordance with audio input and contact may be detected in accordance with physical input. In embodiments, a factor may be detected independent of a type of user input. For example, a sentiment may be detected in accordance with an audio input, a physical input, or a combination of audio input and physical input. In various embodiments, the combination may be commonly used to detect a factor associated with the user input. For example, text of a user input may enable a factor of a thumbs up gesture to be distinguished from a factor of a pointing gesture, despite a physical input for each factor comprising a same pose (e.g., an upward pointing thumb pose).

In various embodiments, detecting the factors 640 may comprise distinguishing user inputs. A pair of detectable user inputs may be a same type. For example, and with brief reference to FIG. 5, first user input 550 and second user input 560 may each comprise a respective audio input. In accordance with detecting the factors 640, first user input 550 may be distinguished from second user input 560 in accordance with a sentiment and/or target of the respective user inputs. The user inputs may be distinguished, for example, independent of another factor. For example, first user input 550 may be differentiated from second user input 560 independent of a text detected for each input.

In embodiments, detecting the factors 640 may comprise detecting a target associated with a user input. The target may comprise a nonplayable character presented via the VR headset prior to detecting the user input. The target may comprise a nonvisual communication channel. The target may be detected based on an audio input of the user input. For example, a name or description may be identified in the audio input to identify the target. The target may be detected based on a physical input of the user input. For example, the physical input may comprise motion data of a headset. The motion data may indicate an orientation of the headset relative to a virtual object. The headset may be oriented toward (e.g., facing) the virtual object. In accordance with the orientation, the virtual object may be identified as the target.

In embodiments, detecting the factors 640 may comprise detecting text associated with the user input. Detecting the factors 640 may comprise generating text information in accordance with the user input. The text may identify an action and/or an object in the first visual simulation state. In embodiments, detecting the factors 640 may comprise transcribing an audio input of the user input. Detecting the factors 640 may comprise applying the user input to transcription module 231 with brief reference to FIG. 2.

In embodiments, detecting the factors 640 may comprise detecting a sentiment associated with the user input. Detecting the factors 640 may comprise generating sentiment information in accordance with the user input. In embodiments, the sentiment may be detected in accordance with one of a tone and/or volume of an audio input of the user input. Detecting the factors 640 may comprise applying the user input to sentiment detection module 233 with brief reference to FIG. 2.

In embodiments, detecting the factors 640 may comprise detecting a gesture associated with the user input. Detecting the factors 640 may comprise generating gesture information in accordance with the user input. In embodiments, the gesture may comprise a gesture of a non-instrumented object captured in image data of the user input. The gesture may comprise a predetermined movement of an equipment of the simulation system. For example, a pose or sequence of poses may be detected as a gesture. The gesture may comprise a status change of an equipment of the simulation system. For example, a change in a status of a safety switch may be detected to comprise a safety off gesture. Detecting the factors 640 may comprise applying the user input to motion detection module 237 with brief reference to FIG. 2.

In embodiments, detecting the factors 640 may comprise detecting a contact associated with the user input. The contact may between a virtual position of a user of the simulation state and a virtual object. The contact may include virtual contact between a nonplayable character in the first visual simulation state and a portion of a user. Detecting the factors 640 may comprise generating contact information in accordance with the user input.

In embodiments, method 600 may comprise detecting an intent 650. The intent may be detected in accordance with a user input. The intent may comprise a result of processing the user input in accordance with one or more detection modules configured to receive the user input and, responsive to one or more factors of the user input, generate an intent in accordance with a manner in which the one or more detection modules were trained. The intent may comprise a filtered user input. For example, a received user input may comprise a text with multiple words and/or sentences among other factors in accordance with an audio input. An intent generated in accordance with the audio input may comprise a filtered text comprising less words and/or sentences and/or other reduced factors, summarizing the received input. For example, the intent may comprise an action and at least one target, wherein the action indicates a desired modification of the at least one target. In embodiments, the intent may be directly determined from a user input. For example, and with brief reference to FIG. 2, intent detection module 238 may be directly applied to a received audio input and/or physical input to generate an intent. In other embodiments, an intent may be detected in accordance with one or more factors detected from a user input. For example, intent detection module 238 may detect an intent based at least in part on information provided by one or more of transcription nodule 231, sentiment detection module 233, target detection module 235, and/or motion detection module 237.

In embodiments, detecting an intent 650 may comprise detecting an intent in accordance with a user input comprising an audio input, a physical input, and/or a combination of an audio input and a physical input. For example, and with brief reference to FIG. 5, an intent may be detected in accordance with a hand gesture of a physical input of third user input 565. Alternately or additionally, an intent may be detected in accordance with a combination of an audio input comprising sounds spoken by a user and a physical input of the user received via an equipment in fourth user input 570. Alternately or additionally, an intent may be detected in accordance with an audio input comprising sounds spoken by a user in accordance with second user input 560. Detecting the intent in accordance with an audio intent may comprise performing a natural language analysis on the audio input of the user input. Detecting the factors 640 may comprise applying the user input to intent detection module 238 with brief reference to FIG. 2. At a given time, an intent may be detectable by a simulation system independent of a specific type of a user input that is subsequently received by the simulation system.

The intent may indicate a purpose of the user input. The intent may indicate a desired change in a simulation state of a simulated environment. For example, an audio input may comprise a question, indicating a desired auditory response from an entity in a simulated environment. The intent may comprise an action. For example, the action may comprise an action of questioning, instructing, informing, reassuring, listening, arresting, acknowledging, moving, contacting or other actions. The intent may comprise a target. For example, the target may comprise a NPC, an equipment, or a non-visible entity as discussed above. Detecting the intent may comprise applying natural language processing to an audio input of the user input. Detecting the intent may comprise analyzing one or more of text data, sentiment information, motion events, and/or target information discussed above. Accordingly, the intent may be detected in accordance with audio input, physical input, or a combination of audio input and physical input of user input. In embodiments, the intent may be provided to other components of simulation system 200. For example, the intent may be transmitted to processor 212 to selectively change a simulation state presented via display 218 of wearable computing device 210.

In embodiments, detecting the intent 650 may comprise providing information regarding an intent to a trainer computing device. For example, information regarding an intent detected by server computing device 230 may be provided to trainer computing device 250. The intent, including as represented in the information, may be visually or audibly output via the trainer computing device 250, thereby enabling a trainer to manually review an automatically detected intent. For example, an automatically detected input may be indicated via a visual display integrated with trainer computing device 250. Responsive to the output, detecting the intent 650 may comprise receiving an input associated with a selected intent via the trainer computing device. For example, trainer computing device 250 may receive an input via a user interface of trainer computing device 250. The input may identify a selected intent. The selected intent may be identified in accordance with an input received via a touchscreen, touchpad, mouse, keyboard, or other input device of the user interface of trainer computing device 350. The selected intent may match the detected intent or comprise another intent different from the detected intent. In alternate or additional embodiments, detecting the intent 650 may comprise receiving a selected intent from a computing device different from a wearable computing device (e.g., trainer computing device 250 different from wearable computing device 230), independent of whether a detected intent is output via the computing device. Such an arrangement may further improve a range of different simulation states provided via wearable computing device, independent of those that may be associated with a user input. In embodiments, the selected intent may be provided as a detected intent for subsequent processing. The selected intent may be provided as the detected intent instead an automatically detected intent. Accordingly, the training computing device may be used to override a computer-detected intent.

In embodiments, method 600 may comprise matching an intent 660. The intent may be a detected intent. For example, the intent may comprise the intent detected upon detecting intent 650. Matching the intent 660 may comprise identifying a matching predetermined intent among a plurality of predetermined intents. The plurality of predetermined inputs may each be associated with a simulation state that may be selected after a first simulation state. For example, each of intents 550-570 are associated with another simulation state 520-540 with brief reference to FIG. 5. Matching the intent 660 may comprise performing a comparison between the detected intent and the plurality of predetermined intents. The intent may be matched when the match is equal to one predetermined intent of the plurality of predetermined intents. In embodiments, matching an intent may comprise detecting the intent to match an intent of the plurality of predetermined intents. In embodiments, matching an intent may comprise detecting the intent does not match an intent of the plurality of predetermined intents. Accordingly, the comparison may indicate that the intent does match (e.g., has one matching intent) or does not match (e.g., has zero matching intents) the one or more predetermined intents. In accordance with the comparison, the simulation state may be selectively changed.

In embodiments, matching the intent 660 may comprise performing a comparison in accordance with a simulation state. In accordance with a training scenario, a plurality of simulation states may be designed as being accessible from a current simulation state. The plurality of simulation states may be less than all simulation states of the training scenario. Matching the intent 660 may comprise performing the comparison between the intent and the plurality of intents associated with next simulation states of a current simulation state. For example, while first simulation state is presented, the simulation system may be configured to detect each predetermined intent among the plurality of detectable predetermined intents. The intent determined among the plurality of detectable predetermined may be determined in accordance with the user input.

In embodiments, matching the intent 660 may comprise performing a comparison between one or more factors of a user input and a plurality of predetermined factors associated with simulation states. For example, a comparison may indicate that a sentiment of negative of fourth user input 570 may match a predetermined factor associated with fourth simulation state 540. The comparison may comprise comparing multiple factors of a user input with multiple predetermined factors for each of multiple simulation states. For example, a comparison may indicate that a neutral sentiment and a target of Bob of first user input 550 may match multiple factors associated with second simulation state 520 or a negative sentiment and a target of Adam match multiple factors associated with fourth simulation state 540. In embodiments according to various aspects of the present disclosure, a comparison of one or more factors and/or an intent detected for a user input may be used in a comparison with one or more predetermined factors and/or a predetermined intent associated with each of a plurality of simulation states.

In embodiment, matching the intent 660 may comprise providing the selected intent for subsequent processing. For example, the selected intent may be provided to server computing device 230 from trainer computing device 250 to modify the simulation state. For example, an intent received via wearable computing device 210 and detected by server 230 may be audibly or visually indicated to a trainer via trainer computing device 250. Responsive to the detected intent, the trainer may provide an input that selects an intent different from the detected intent. The trainer may alternately provide an input that confirms the detected intent is accurate. In some embodiment, the detected intent may be determined to be a selected intent, absent an input from a trainer computing device 250. In some embodiments, a selected intent may be received at server computing device 230. Server computing device 230 may modify a simulation state provided to wearable computing device 230 in accordance with the simulation state.

In embodiments, method 600 may comprise updating a simulation state 670. The simulation state may be updated in accordance with determining the intent matches zero intents of the plurality of predetermined intent upon matching the intent 660. Further comprising, when the comparison indicates that the intent does not include a matching intent in the set of predetermined intents, updating the first visual simulation state. In embodiments, updating the simulation state may comprise repeating a presentation of a virtual object in accordance with the simulation state. For example, an animation and/or image associated with a virtual object may be repeated in accordance with updating the simulation state 670. Alternately or additionally, another sound associated with a virtual object may be provided. For example, and with brief reference to FIG. 5, updating first simulation state 510 may comprise playback of another audio output from a set of audio output associated with Adam. The other audio output may be a same or different audio output as previously emitted for Adam in first simulation state 510. Updating the simulation state may comprise repeating an audio output previously presented. In embodiments, updating the simulation state 670 may comprise modifying a feature of a virtual object. For example, updating the simulation state 670 may comprise increasing an animation level of an NPC, increasing a volume of audio output associated with the NPC, increasing a speed of animation of the NPC, and/or repositioning the NPC within an environment in the first visual simulation state. For example, updating the simulation state 510 may comprise presenting the NPC closer to the user of the VR headset within the first visual simulation state. In embodiments, updating the simulation state may comprise an incremental adjustment of the feature of the virtual object. In embodiments, updating the simulation state 670 may comprise maintaining at least part of the simulation state as previously presented. For example, and with brief reference to FIG. 3C, changing a simulation state may cause at least one change to each of first NPC 390 and second NPC 395, while updating a simulation state associated with the simulation state of image 350 may comprise adjusting a feature of first NPC 390 and maintaining second NPC 395 as previously presented. Accordingly, updating a simulation state may provide an indication that an intent has been received, but is insufficient to further progress through a training simulation. Updating a first simulation state 670 may alternately or additionally increase stimulation of one or more senses of a user, thereby representing an increasingly complex and stressful set of circumstances that may be encountered in a real-world incident.

In embodiments, method 600 may comprise selecting a second simulation state in accordance with user input 680. The simulation state may be selected in accordance with a detected intent. The second simulation state may be selected in accordance with a comparison that identifies a match between an intent and a predetermined intent. Selecting the second simulation state 680 may comprise selecting a simulation state associated with the matching user input identified in accordance with matching an intent 660.

In embodiments, selecting the second simulation state 680 may comprise presenting the selected simulation state. Presenting the selected simulation state may comprise changing an audio and/or video output provide via a wearable computing device of a simulation system. For example, one or more features of a virtual object may be changed in accordance with the simulation state. The simulated environment may be changed in accordance with a detected intent. For example, when the intent comprises a first predetermined intent of the plurality of predetermined detectible intents, a second visual simulation state of the plurality of visual simulation states may be presented. When the determined intent corresponds to a second predetermined intent of plurality of predetermined detectible intents, a third visual simulation state of the plurality of visual simulation states different from the second visual simulation state may be presented. In embodiments, and with brief reference to FIG. 2, processor 212 may be configured to change a simulated environment in accordance with an intent.

Figure 7:
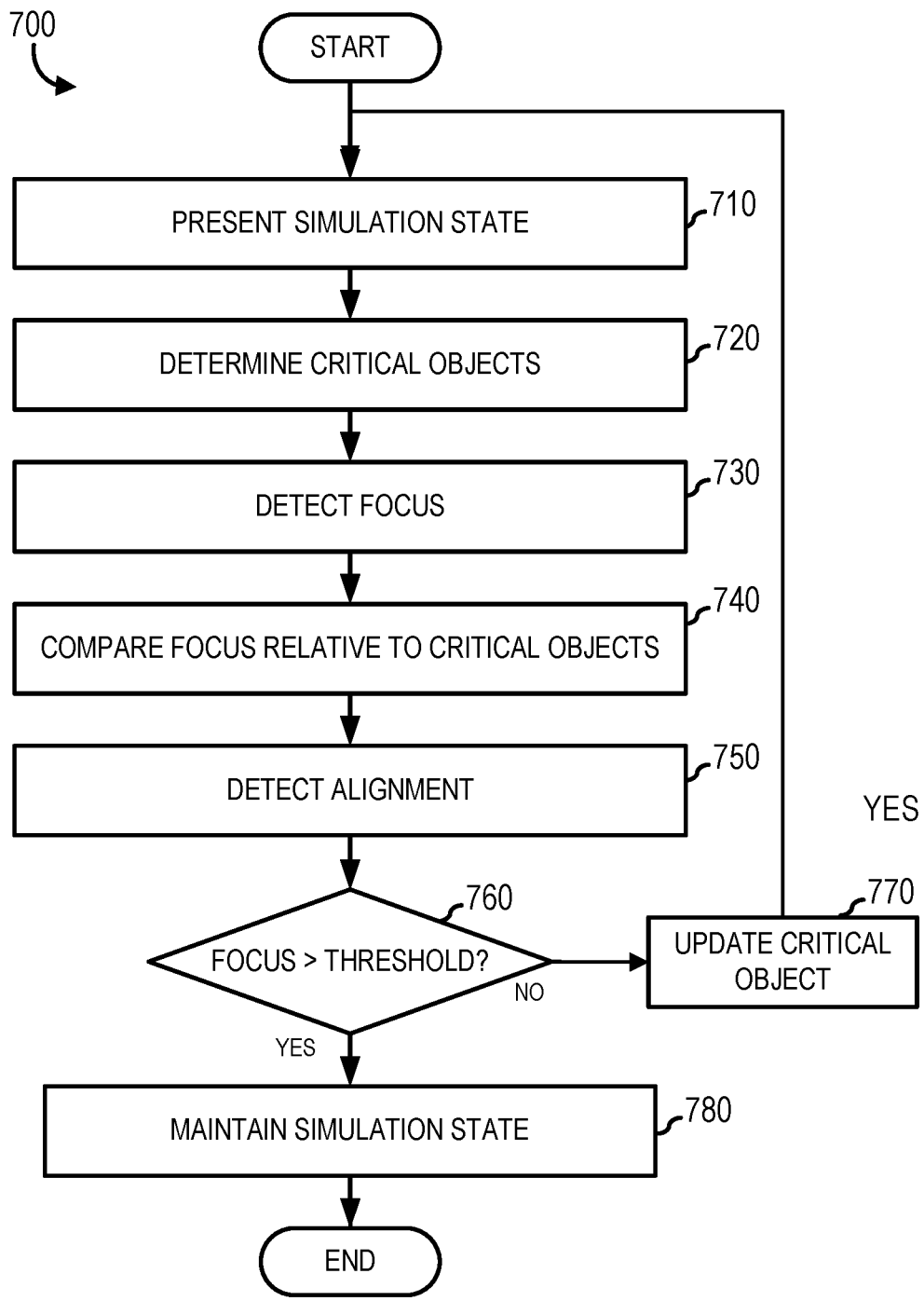
FIG. 7 illustrates a method of controlling a simulation system in accordance with a focus of a user in accordance with various embodiments described herein.

In various embodiments, a simulation system may be controlled in accordance with a physical input comprising a focus of a user. The simulation system may comprise an image sensor oriented toward an eye of a user. The image sensor may capture an image of the eye of the user. The simulation system may comprise an object detection module that, when applied to an image of the eye of the user, may detect a direction of focus of the user. A component of the simulation system, such as the object detection module or a processor, may further receive a simulation state and the direction of focus, and in accordance with the simulation state and direction of focus, detect whether the direction of focus is oriented toward a virtual object in a simulated environment. For example, and with brief reference to FIG. 7, method 700 may comprise various operations for controlling a simulation system in accordance with a focus of a user. Method 700 may comprise one or more of presenting a simulation state 710, determining critical objects 720, detecting a focus 730, comparing a focus relative to critical objects, detecting an alignment 750, comparing the focus to a threshold 760, updating a critical object 770, and/or maintaining a simulation state 780.

In embodiments, presenting a simulation state 710 may be performed. Presenting a simulation state 710 may comprise presenting at least one virtual object. The at least one virtual object may be presented via a display of a wearable computing device. In embodiments, presenting the simulation state 710 may comprise one or more operations of presenting a first simulation state 610 with brief reference to FIG. 6, In embodiments, determining critical objects 720 may be performed. A critical object may comprise a virtual object that requires a physical input indicative of the user seeing (e.g., viewing, looking at, etc.) the virtual object during the training scenario. The training scenario may comprise one or more critical objects designated for one or more simulation states, including less than all simulation states of a training scenario. For example, a critical object may comprise an NPC or a weapon. Failure to provide a user input comprising a focus of the user may cause the critical object to be controlled in unpredictable manners during a training scenario. For example, a position of a critical object may change rapidly if a predetermined physical input is not received. The critical object may disappear from the simulation state if the predetermined physical input is not received. The training simulation may be controlled to terminate immediately if the predetermined physical input is not received for the critical object. Controls of a simulation state for a critical object may be different from a non-critical object. For example, a non-critical object may be presented in a simulation state independent of a physical input that is received. Alternately or additionally, a focus of a user may correspond to another feature of a user input that may be detected in accordance with detecting the factors 640 (with brief reference to FIG. 6). Determining critical objects 720 may comprise receiving information for the training scenario identifying one or more virtual objects in one or more simulation states as a critical object.

In embodiments, detecting a focus 730 may be performed. Detecting the focus 730 may provide focus information for the focus of the user. The focus information may comprise position information. The position information may indicate a location on a display to which the eye was oriented when an image of the eye is captured. For example, and with brief reference to FIG. 2, simulation system 200 may comprise an image sensor 213 oriented toward an eye of a user. The image sensor (e.g., inward facing image sensor) may be integrated with wearable computing device 210. The image sensor may capture an image of the eye of the user. Object detection module 219A may, when applied to the image of the eye of the user, may detect a direction of focus of the user.

In embodiments, comparing a focus relative to critical objects 740 may be performed. For example, position information generated via detecting the focus 730 may be received. The position information may indicate a physical location on a display to which the eye was oriented when the image was captured. Position information regarding the critical object may also be received. The position information may indicate a physical location on a display at which a critical object was displayed when the image was captured. Comparing the focus may comprise comparing the position information of the focus of the user and the position information regarding the critical object. The position information of the focus of the user and the position information regarding the critical object may be compared for a period of time.

In embodiments, detecting an alignment 750 may be performed. Detecting the alignment may be performed in accordance with comparing the focus 740. Detecting the alignment may comprise detecting position information of the focus of the user and the position information match (e.g., overlap, are aligned, etc.). Alternately or additionally, detecting the alignment may comprise detecting an amount of difference between the position information of the focus of the user and the position information.

In embodiments, comparing the focus to a threshold 760 may be performed. The threshold may comprise a time threshold. For example, a period of time during which alignment is detected to match in accordance with detecting the alignment 750 may be compared to the time threshold. When the period of time is greater than the time threshold, the focus may be detected to be equal or greater than the threshold. Alternately or additionally, the threshold may comprise a spatial threshold. For example, the amount of difference between the position information of the focus of the user and the position information detected in accordance with detecting the alignment 750 may be compared to the spatial threshold. When the amount is equal or less than the threshold, the focus may be detected to be equal or greater than the threshold.

In embodiments, updating a critical object 770 may be performed. Updating the critical object may comprise one or more operations of updating the simulation state 670 with brief reference to FIG. 6. Updating the critical object 770 may comprise updating features of the critical object associated with the comparing the focus 740. For example, an NPC may move closer to a user viewpoint, increase in animation level, increase in volume of audio output, and/or be removed from the simulation state when the focus is not aligned with the critical object. In embodiments, updating the critical object may cause the training scenario to terminate. Accordingly, a critical object in a training scenario may be selectively controlled in accordance a predetermined physical input not being received for the critical object. The critical object may be indirectly controlled in accordance with a target of the focus of the user.

In embodiments, maintaining a simulation state 780 may be performed. Maintaining the simulation state 780 may comprise maintaining one or more features of the critical object a presented in accordance with presenting simulation state 710. Accordingly, the critical object may be controlled to be retained in a simulation state in accordance with a predetermined physical input. In embodiments, one or more operations of method 700 may be executed by one or more components of same or different computing devices, including wearable computing device 210 with brief reference to FIG. 2.

In embodiments, alternate or additional methods of detecting an object in an image may be employed. For example, a wearable device comprising indicia may be added to the object to improve detection of the object. The indicia may cause the object to appear to be marked in the image. The indicia may be unique, enabling image processing to detect the indicia and thus the object to perform specific processing to reliably detect the object.

In embodiments, the indicia may comprise passive indicia. Passive indicia, as used herein, may not indicate a position of the object alone. The passive indicia may not include a sensor configured to detect a position of the object or the indicia itself. The passive indicia may be sensorless. The passive indicia may reflect or emit a signal that itself lacks positional information regarding the indicia or the object to which the indicia is physically coupled.

In embodiments, the indicia may comprise lighted indicia. For example, the indicia may comprise at least one light. The light may comprise at least one light-emitting diode (LED). The lighted indicia may comprise a predetermined color or arrangement of one or more lights. For example, the lighted indicia may comprise an array of LEDs. Each LED in the array of LEDs may be spaced apart from another LED. For example, the lighted indicia may comprise a sequence of lights disposed at a regular interval along a line.

In embodiments, the indicia may comprise a pattern. The pattern may comprise a predetermined pattern. The pattern may comprise one or more of a printed pattern, woven pattern, dyed pattern, or a static pattern. For example, the pattern may comprise a (QR) code, a bar code, or a calibration card pattern. The pattern may comprise a predetermined size. The pattern, when captured in an image by an image sensor, may enable a location of the pattern to be distinguished relative to a variety of other objects in the image. The pattern may enable a location of an associated object to be detected in accordance with representation of the pattern in the image. The pattern may enable the pose of the associated object to be determined in accordance with the representation. The pattern may enable a distance between the image sensor and the indicia to be determined in accordance with the manner in which the pattern in captured in the image.

In embodiments, a wearable substrate comprising the indicia may be provided. The substrate may comprise a flexible substrate. The substrate may comprise a resilient substrate. The indicia may be integrated with the substrate. The substrate may enable the indicia to be selectively coupled to the object. The indicia may be affixed to the object via the substrate. The substrate may be removably coupled to the object. For example, the substrate may comprise a sticker configured to adhere to a portion of a user or a wearable band configured to at least partially encircle the portion of the user. The substrate may comprise one or more of an adhesive layer, elastic layer, or adjustable layer that enable the indicia to be temporarily coupled to the object. Such indicia may enable a user to adorn the user to adorn the indicia during a training session, while minimally altering the set of equipment worn during training relative a real-world scenario. The indicia may enable the user to interact with a training system in an intuitive manner.

In embodiments, a wearable device comprising a substrate and at least one indicia may be provided. The wearable device may be configured to be selectively coupled to a portion of an object. For example, the wearable device may be sized and shaped to be selectively worn on a finger or wrist of a user. The wearable device may comprise a hand-mounted wearable device and/or be configured to physically attached to a hand of a user. The wearable device may comprise a form factor of at least one of a glove, ring, or wristband. A weight of the wearable device may be minimal, enabling an object to behave in a natural manner, similar to an arrangement in which the wearable device is not coupled to the wearable device.

In some embodiments, the wearable device may comprise a simplified implementation of an equipment. The wearable device may comprise a simple circuit configured to control indicia of the wearable device. For example, the wearable device may comprise a user interface. The user interface for the wearable device may at least comprise one or more lights. The user interface may also comprise a manual input component configured to selectively cause the one or more lights to be illuminated (e.g., turned on, activated, etc.) or non-illuminated (e.g., turned off, deactivated, etc.). For example, the wearable device may comprise a switch or button to activate the one or more lights responsive to a first input received via the switch or button or deactivate the one or more lights responsive to a second input received via the switch or button.

In embodiments, the wearable device may comprise a passive device. A passive device may be configured to provide indicia capturable by an image capture device independent of a manner in which the passive device is used. The same indicia may be provided by the passive device independent of the manner in which the passive device is positioned. For example, an illumination may be provided by one or more lights of a passive device comprising lighted indicia, regardless of a rotation, three-dimensional position, or movement of the passive device. The indicia may lack (e.g., not generate) information regarding a position of the passive device. The indicia may remain unchanged relative to a change in position of the passive device. The passive device may lack a sensor or other device by which position information regarding a position of the passive device may be determined by the passive device. The wearable device may be sensorless. For example, and relative to wearable computing device 210 or equipment 220, the wearable device may lack a position sensor. The passive device may lack components to provide a signal, aside from one or more signals that are respectively generated, emitted, and/or reflected from the indicia. For example, compared to equipment 220, the passive device may lack a wireless communication interface with brief reference to FIG. 2. Relative to equipment 220, the passive device may lack a processor 222 and memory 224. Rather, the equipment 220 may comprise a power supply such as a battery, at least one lighted indicia, and a user interface to selectively couple the power supply to the lighted indicia to activate or deactivate the lighted indicia. The lighted indicia may emit at least one light signal when activated and not emit the at least one light signal when deactivated. In some embodiments, the passive device may lack electronic components altogether. To obtain a position of the passive device, a wearable computing device may require the passive device to be captured in an image via an image sensor of the wearable computing device and for the image to be further processed in order to determine a position of an object in which the passive device is disposed. The passive device may improve detection of the object from an image; however, one or more operations may yet be applied to the image in order to detect the position of the object. The one or more operations may comprise at least same one operation applied to an image to alternately detect a position of a non-instrumented object in same or different embodiments according to various aspects of the present disclosure.

In embodiments, a system comprising one or more devices configured to detect a position of an equipment relative to a field of view may be provided. The field of view may be a field of view of an image sensor of a first device of the one or more devices. The first device may comprise, for example, wearable computing device 210. A second device of the one or more devices may comprise a wearable device. In embodiments, the system may further comprise the equipment. The equipment may comprise equipment 220. The one or more devices of the system may alternately or additionally comprise a plurality of different wearable devices. The plurality may include the second device and at least one other wearable device.

In embodiments, detecting the position of the equipment may comprise detecting a position of a passively-instrumented object. The passively-instrumented object may comprise an object to which a wearable device of the system is physically coupled. The position of the passively-instrumented object may be detected via image processing applied to an image captured by the system. Indicia of the wearable device may be captured in the image. The image may be captured by the first device of the system. The position may be determined at the first device. The position of the passively-instrumented object may be determined in accordance with a location in the image in which the indicia of the wearable device are captured. The manner in which position of the passively instrumented object is detected in the system may be different from the equipment, which may be configured to transmit position information that it itself has generated to the first device.

Figure 8:
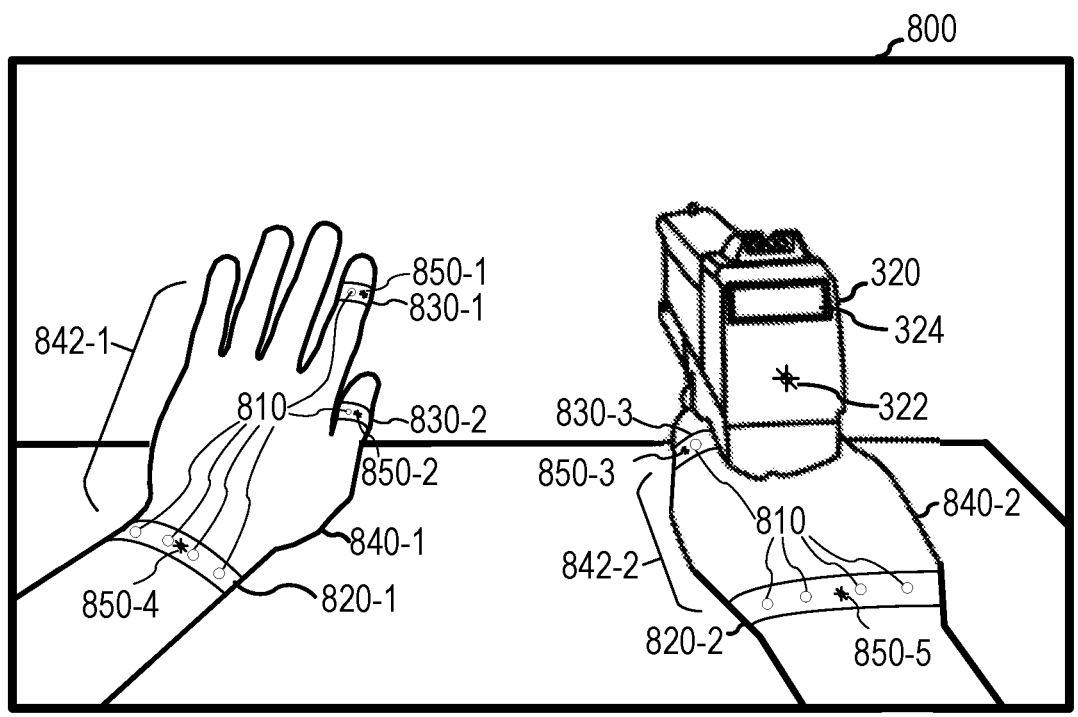
FIG. 8 illustrates image data analyzed by a simulation system, in accordance with various embodiments described herein.

In embodiments, detecting the position of the equipment may comprise detecting the position of the equipment in accordance with an image captured by a first device of the system. For example. with reference to FIG. 8, image 800 may be captured by the first device of the system. Image 800 may comprise an image to which image processing may be applied to detect the position of the equipment. A field of view of an image sensor of the first device may be captured to generate image 800. The image may further represent the equipment. For example, image 800 comprises equipment 320. One or more wearable devices of the system may also be captured in the image. The wearable devices may comprise passive devices. The wearable devices may be further configured to be coupled to different portions of a passively-instrumented object. For example, the one or more wearable devices may comprise one or more wrist-mounted wearable devices configured to physically attach to a first portion of the object. Alternately or additionally, the one or more wearable devices may comprise one or more finger-mounted devices configured to physically attach to a second portion of the same object, different from the first portion. For example, a field of view captured in image 800 may include equipment 320, one or more wrist-mounted wearable devices 820, and one or more finger-mounted wearable devices 830. The one or more wearable devices may be further coupled to one or more passively-instrumented objects. For example, a first passively-instrumented object 840-1 and a second passively-instrument object 840-2 may be captured in image 800. At least one of the passively-instrumented objects 840, such as second passively-instrumented object 840-2, may be disposed proximate equipment 320 in image 800. In some embodiments, a passively-instrumented object of objects 840 may comprise a part of an arm of a user of equipment 320. For example, the part may include a hand, wrist, finger or thumb of the arm of the user.

In some embodiments, a wearable device may comprise different types of body-worn articles. For example, a finger-mounted wearable device of devices 830 may comprise a ring. Alternately or additionally, a wrist-mounted wearable device of devices 820 may comprise a watchband or wristband. Alternately or additionally, a glove may comprise at least one finger-mounted wearable device of devices 830 and/or at least one wrist-mounted wearable device of devices 820.

In embodiments, each wearable device coupled to a passively-instrumented object may comprise indicia. Each wearable device may comprise at least one indicia. Each wearable device may comprise a plurality of indicia. A first wearable device coupled to the object may comprise a different indicia relative to a second wearable device coupled to the object. For example, each wearable device of one or more wrist-mounted wearable devices 820 of the system may comprise one or more indicia 810. A wrist-mounted wearable device, such as first wrist-mounted wearable device 820-1 or second wrist-mounted wearable device 820-2, may each comprise at least one indicia 810. In some embodiments, a wrist-mounted wearable device, such as first wrist-mounted wearable device 820-1 and/or second wrist-mounted wearable device 820-2 may each comprise a plurality of indicia 810. Alternately or additionally, each wearable device of one or more finger-mounted wearable devices 830 of the system may comprise one or more indicia 810. A finger-mounted wearable device, such as first finger-mounted wearable device 830-1, second finger-mounted wearable device 830-2, or third finger-mounted wearable device 830-3 may each comprise at least one indicia 810. In some embodiments, a finger-mounted wearable device, such as first finger-mounted wearable device 830-1, second finger-mounted wearable device 830-2, and/or third finger-mounted wearable device 830-3, first wrist-mounted wearable device 820-1 and/or second wrist-mounted wearable device 820-2 may each comprise a plurality of indicia 810. In some embodiments, a finger-mounted wearable device may comprise fewer indicia, a different color of indicia, a different arrangement of indicia, or a different size relative to indicia of a wrist-mounted wearable device. Different indicia on different wearable devices may enable different portion of the passively-instrumented object to be recognized in an image in which the wearable devices and object are captured.

In embodiments, each indicia may comprise a different visual element. Each indicia of a plurality of indicia may comprise discrete indicia. For example, each indicia of indicia 810 may comprise a separate light-emitting diode. A portion of a substrate of the wearable device may be positioned between each of the discrete indicia. Alternately or additionally, each indicia may comprise a discrete pattern. The indicia on a same wearable device may comprise same or different indicia. In embodiments, different indicia on a same wearable device may enable different portion of the wearable device to be recognized in an image in which the wearable device is captured. The different portions may visually indicate a position of the wearable device relative to a wearable computing device by which the image is captured. The different indicia may enable rotation of the wearable device, which may correspond to rotation of the passively-instrumented object, to be identified via image processing. In other embodiments, same, multiple indicia on a same wearable device may enable a position of the wearable device to be reliably identified, independent of a rotation of the wearable device relative to the wearable computing device.

In embodiments, the position of an equipment may be detected in accordance with an image. For example, and with reference to FIG. 8, an image 800 may be captured by a wearable computing device of a simulation system. The wearable computing device may comprise one or more of a wearable computing device 210 and a device configured to capture image 310 with brief reference to FIG. 2-3A. Image 800 may comprise an equipment 320 comprising display 324. Image 800 may further capture one or more indicia 810 of one or more wearable devices coupled to one or more passively-instrumented objects 840. The one or more wearable devices may comprise one or more wrist-mounted wearable devices 820 and/or one or more finger mounted wearable devices 830. One or more operations applied to image 800 may detect one or more positions 850 of the wearable devices. Positions of the one or more objects 840 may be detected in accordance with the one or more positions 850 via the one or more operations. The one or more operations may further comprise detecting one or more poses 842 associated with respective passively-instrumented objects 840. The one or more operations may further comprise detecting position 322 of equipment 320. Positions 322, 850 may not be captured in image 800; rather, these positions relative to image 800 may be detected in accordance with subsequent image processing applied to image 800. In embodiments, image 800 may comprise a same field of view as image 310 of FIG. 3A and FIG. 3B relative to an equipment and one or more objects captured in the image. In accordance with one or more positions 850, one or more images corresponding to equipment and the passively-instrumented objects may be rendered in an image. For example, the one or more operations may be applied to image 800 to generate image 350 comprising a simulated environment with brief reference to FIG. 3C. In embodiments, and as further discussed below, an image and/or position of virtual equipment or one or more objects may be determined in accordance with position information received from equipment 320 and position information detected for objects 840 and positions 850 of wearable devices 820,830.

Figure 9:
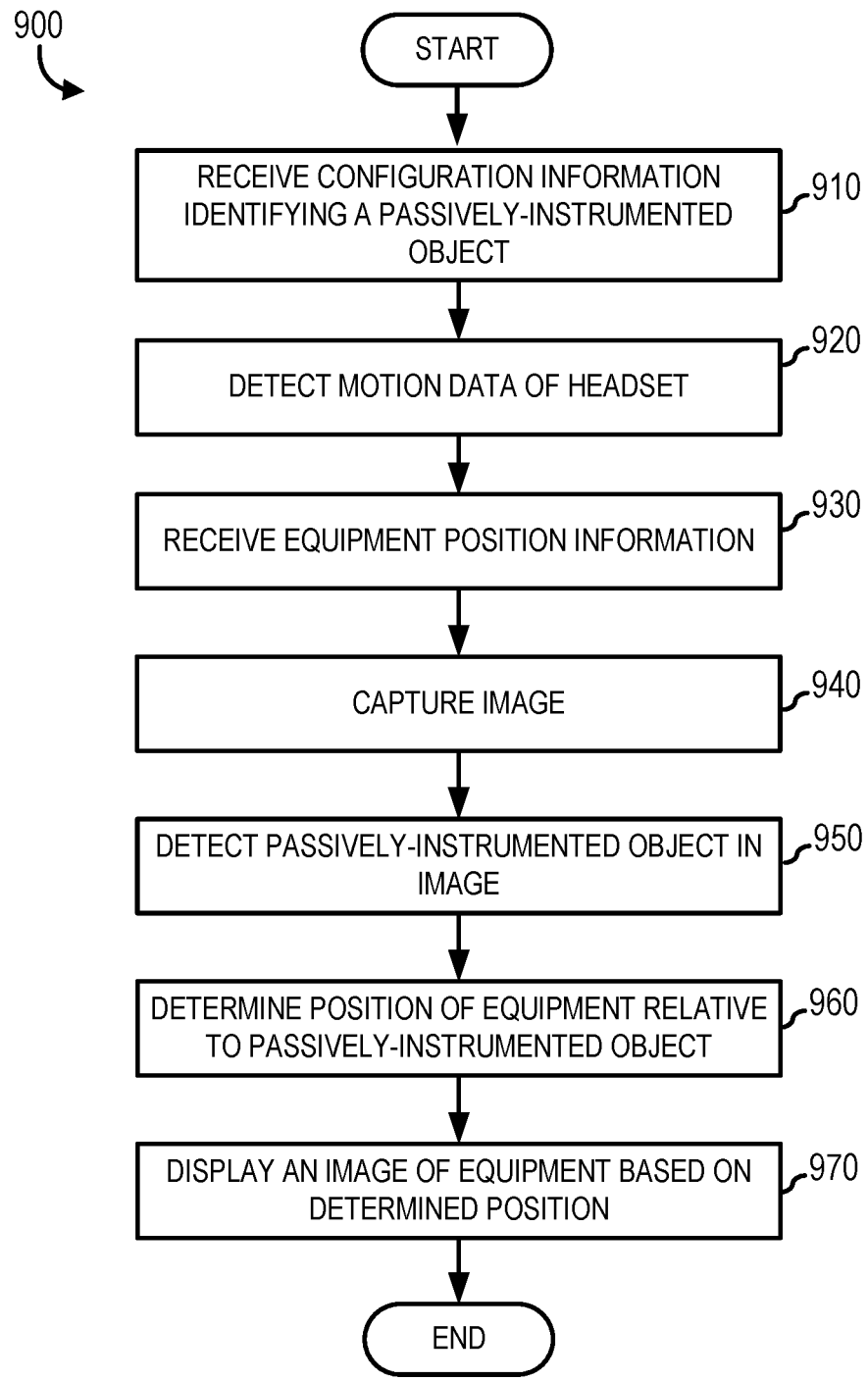
FIG. 9 illustrates a method of detecting equipment in accordance with various embodiments described herein.

In various embodiments, a method comprising one or more operations for detecting equipment for a training simulation may be provided. For example, and with reference to FIG. 9, method 900 may comprise one or more of receiving configuration information identifying a passively-instrumented object 910, receiving motion data of a headset 920, receiving equipment position information 930, capturing an image 940, detecting a passively-instrumented object in an image 950, determining a position of an equipment relative to a passively-instrumented object 960, or displaying an image of an equipment based on a position 970. Method 900 may be performed by one or more devices of a simulation system. For example, and with brief reference to FIGS. 1 and 2, one or more operations of method 900 may be performed by headset 110 and/or server 130 or wearable computing device 210 and/or server computing device 230.

In embodiments, and after starting, method 900 may comprise receiving configuration information identifying passively-instrumented object 910. The passively-instrumented object may comprise a passively-instrumented object with which an equipment may be used during a training simulation. For example, and with brief reference to FIG. 8, the configuration information may indicate second passively-instrumented object 840-2. The configuration information may indicate that equipment 840-2 may be used in a right hand of a user during a training scenario. The configuration information may be received prior to detecting a passively-instrumented object in image 800. The configuration information may be received prior to detecting position information of a passively-instrumented object in the image. The configuration information may be received via a user interface of a device of simulation system. For example, the configuration information may be received via user interface 228 of equipment 220, a user interface 258 of trainer computing device 250, an input audio interface 211 of wearable computing device 210, an image sensor 213 of wearable computing device 210, a user interface comprising one or more actuatable elements (not shown) of wearable computing device 210, or combinations of two or more such elements. By receiving configuration information identifying the passively-instrumented object, a user of a wearable computing device may be enabled to train using equipment 320 in a manner similar to a real-world incident. In embodiments, the configuration information may identify a plurality of equipment and at least one passively-instrumented object for each equipment of the plurality of equipment.

In embodiments, receiving configuration information identifying passively-instrumented object 910 may comprise receiving wearable device information that identifies one or more wearable devices associated with one or more passively-instrumented objects. The wearable device information may indicate characteristics of the one or more wearable devices to be detected from an image. For example, the wearable device information may comprise information that indicates a color, pattern, or layout of one or more indicia 810 on one or more wearable devices. The wearable device information may indicate characteristics of an individual wearable device. For example, wearable device information may indicate that indicia 810 of first wrist-mounted wearable device 820-1 comprise a series of LEDs that emit a first color of light. The wearable device information may indicate characteristics of a different types of wearable devices. For example, wearable device information may indicate that indicia 810 of wrist-mounted wearable devices 820 comprise LEDs that emit a first color of light and indicia of finger-mounted wearable device 830 emit a second color of light different from the first color of light. In some embodiments, the wearable device information may identify an association between at least one wearable device and a respective passively-instrumented object. The information may further identify a portion of the object associated with a respective wearable device. For example, the wearable device information may indicate that first wrist-mounted wearable device 820-1, first finger-mounted wearable device 830-1, and second finger-mounted wearable device 830-2 are associated with first passively-instrumented object 840-1 and third finger-mounted wearable device 830-3 and second wrist-mounted wearable device 820-2 is associated with second passively-instrumented object 840-2. In some embodiments, the wearable device information may further indicate that first wrist-mounted wearable device 820-1 is associated with a left wrist portion of first passively-instrumented object 840-1, first finger-mounted wearable device 830-1 is associated with a finger and/or pointer finger (i.e., relative finger) portion of first passively-instrumented object 840-1, and second wearable device 830-2 is associated with a thumb portion of first passively-instrumented object 840-1. The information may further indicate third finger-mounted wearable device 830-3 is associated with a thumb portion of second passively-instrumented object 840-2 and second wrist-mounted wearable device 820-2 is associated with a wrist portion of second passively-instrumented object 840-2. In embodiments, the wearable device information may indicate a number of wearable devices associated with an object. For example, the information may indicate that each object of objects 840 is associated with three wearable devices. Depending on a field of view of a subsequent image and a relative position between an image sensor and each object, the number of wearable devices may or may not be captured in an image.

In embodiments, method 900 may comprise detecting motion data of a headset 920. The motion data may indicate movement of a user. For example, the motion data may indicate at least one of rotation of a user's head or movement of a user's body. The motion data may be detected via position sensors. For example, the motion data may be detected by position sensors 217 with brief reference to FIG. 2. The motion data may be provided to processor 212 to enable processor 212 to update an image of a simulation state presented via display 218. In some embodiments, detecting motion data of a headset 920 may comprise detecting motion data of a headset 420 with brief reference to FIG. 4.

In embodiments, method 900 may comprise receiving equipment position information 930. The equipment may comprise a conducted electrical weapon, a firearm, or a bola launcher. The equipment position information may comprise position information of the equipment at a point in time. The equipment position information may identify a position of the equipment. The equipment position information may comprise three degrees of rotational position information (e.g., roll, pitch, and yaw). The position may comprise a rotational position. The equipment position information may comprise pose information. For example, and with brief reference to FIG. 8, the position information may indicate position 322. The equipment position information may be detected by equipment 320. The equipment position information may be received via a wireless connection between the equipment and another device of a simulation system. For example, equipment 220 may transmit equipment position information to wearable computing device 210 via wireless communication interface 226 and wireless communication interface 216 with brief reference to FIG. 2. In some embodiments, receiving equipment position information 930 may comprise receiving equipment position information 430 with brief reference to FIG. 4.

In embodiments, method 900 may comprise capturing an image 940. The image (i.e., captured image) may comprise an image in forward facing direction from a headset. The image may comprise a field of view oriented in direction opposite another direction in which a display of the headset is oriented. The image may comprise one image of a sequence of images (i.e., video data). The image may be captured by an imaging component integrated with a headset. For example, the image may be captured by one of camera 112 or image sensor 213 with brief reference to FIG. 1-2. In some embodiments, capturing an image 940 may comprise capturing an image 440 with brief reference to FIG. 4.

In embodiments, method 900 may comprise detecting a passively-instrumented object in an image 950. The image may comprise the image generated in accordance with capturing an image 940. The passively-instrumented object may comprise a part or portion of a body of a user. For example, the part of the body may comprise a wrist of the user. The part of the body may comprise one or more fingers of the user.

In embodiments, detecting a passively-instrumented object in an image 950 may comprise detecting indicia of one or more wearable devices. For example, detecting first passively-instrumented object 840-1 may comprise detecting indicia 810 of first wrist-mounted wearable device 820-1, first finger-mounted wearable device 830-1, and/or second finger-mounted wearable device 830-2 in image 800. Alternately or additionally, the detecting may comprise detecting second passively-instrumented object 840-2, which may comprise detecting indicia 810 of second wrist-mounted wearable device 820-2 and/or third finger-mounted wearable device 830-3 in image 800. Each wearable device may be detected by an object detection module configured to detect an object type of the wearable device. For example, object detection module 219A may be configured to detect each of one or more of wearable devices 820,830 in image 800. In embodiments, the detecting may be performed in accordance with received wearable device information. For example, the wearable device information may be applied by object detection module 219A to detect each of one or more of wearable devices 820,830 in image 800.

In embodiments, detecting a passively-instrumented object in an image 950 may comprise detecting a position in an image of each of one or more wearable devices. The position may be detected in accordance with indicia detected for a respective wearable device. The position may comprise a position in an image of the indicia. The position may be equal to a location of pixels by which the indicia are represented. For example, first position 850-1 of first finger-mounted wearable device 830-1 may be equal or adjacent to a location of indicia 810 of first finger-mounted wearable device 830-1, second position 850-2 of second finger-mounted wearable device 830-2 may be equal or adjacent to a location of indicia 810 of second finger-mounted wearable device 830-2, and/or third position 850-3 of third finger-mounted wearable device 830-3 may be equal or adjacent to a location of indicia 810 of third finger-mounted wearable device 830-3. Alternately or additionally, the position may comprise a position determined relative to a plurality of indicia detected for a given wearable device in the image. For example, a fourth position 850-4 may be detected in accordance with a central position of indicia 810 of first wrist-mounted wearable device 820-1 and/or a fifth position 850-5 may be detected in accordance with a central position of indicia 810 of second wrist-mounted wearable device 820-2. The central position may comprise an average vertical position and horizontal position of the indicia on which the central position is determined. In embodiments, the position of a wearable device may comprise a position associated with an entirety of the wearable device. For example, an object detection module may be configured to detect each location of a plurality of locations in an image associated with a wearable object. The locations may comprise locations of pixels representing indicia and a substrate of the wearable object. Detecting the location of the wearable device may comprise selecting a location of the plurality of locations. For example, a central location of the plurality of locations may be selected, though in other embodiments, an alternate reference location for the wearable device may be selected.

In embodiments, detecting the passively-instrumented object 950 may comprise detecting position information of the passively-instrumented object. The position information may comprise a position of a part of a body of the user. For example, the position information may indicate a position of a wrist of a user, wherein the first passively-instrumented object 840-1 may comprise the wrist. The position may comprise a physical position of the passively-instrumented object in three-dimensional space. The position may comprise three degrees of translational position information associated with the passively-instrumented object. For example, the position may indicate a lateral position, vertical position, and/or distance position of the passively-instrumented object relative to an image sensor configured to an image sensor that captured the image in which the passively-instrumented object was detected. In embodiments, the position may be relative to a reference position (e.g., plane, position, etc.) of the image sensor that captured the image in which the passively-instrumented object was detected. In embodiments, the position may determined in accordance with position of a wearable device. For example, the position of the object may be determined to be equal to the position of a wearable device associated with the object. In embodiments, an association between the object and wearable device may be determined in accordance with configuration information and/or information generated by an object detection module that detects a closest object to a wearable device. In embodiments, the position of the object may be selected to be equal to the position of the wearable device. For example, a position of first passively-instrumented object 840-1 may be selected to equal to at least one of first position 850-1, second position 850-2, or fourth position 850-4. A position of second passively-instrumented object 840-2 may be selected to equal to at least one of third position 850-3 or fifth position 850-5.

In embodiments, the position information of the passively-instrumented object may comprise a pose of the passively-instrumented object. For example, the position information may comprise first pose 842-1 of fingers of first passively-instrumented object 840-1 with brief reference to FIG. 8. The position information may comprise second pose 842-2 of fingers of second passively-instrumented object 840-2. In embodiments, the position information may be generated in accordance with one or more positions of one or more wearable device coupled to an object. The position information may comprise matching predetermined position information with the one or more positions. In some embodiments, the matching may comprise matching a number of the one or more positions. For example, one or more of first position 850-1, second position 850-2, and fourth position 850-4 may be matched to first pose 842-1. One or more of third position 850-3 and fifth position 850-5 may be matched with second pose 842-2. The number may include positions that are not detected, fewer than a number of detectable in accordance with wearable device information. For example, an undetected position of a finger-mounted wearable device for second passively-instrumented object 840-2 may be matched with second pose 842-2, wherein second pose 842-2 comprise a grip pose. The matching may alternately comprise a relative spacing between positions. For example, a first spacing between first position 850-1 and second position 850-2 may be matched with first pose 842-1, which may include an open hand pose, rather than a grip pose or a fist pose of first passively-instrumented object 840-1.

In embodiments, method 800 may comprise determining a position of an equipment relative to a passively-instrumented object 960. The position may comprise a relative position. The position of the equipment may be determined in accordance with received equipment position information and detected position information for the passively-instrumented object. Determining the position of the equipment relative to the passively-instrumented object may comprise applying translational position information from the detected position information with rotational position information received from the equipment. Applying the translational position information to the rotational positional information may provide six degrees of freedom information for the equipment. An anchor point of the equipment position information may be determined to be proximate an anchor point of the position information of the passively-instrumented object to determine the position of the equipment relative to the passively-instrumented object. An anchor point of the equipment position information may be determined to be a default distance (e.g., three inches, less than six inches, etc.) away from an anchor point of the position information of the passively-instrumented object to determine the position of the equipment relative to the passively-instrumented object. An anchor point of the equipment position information may be determined to be a default direction (e.g., forward, away from the user, distal and above, etc.) from an anchor point of the position information of the passively-instrumented object to determine the position of the equipment relative to the passively-instrumented object. In embodiments, the position of the equipment relative to the passively-instrumented object may be determined in accordance with configuration information previously received by a simulation system. The configuration information may indicate which passively-instrumented object of a plurality of passively-instrumented objects the equipment should be determined to be relatively positioned. For example, determining the position 960 may comprise determining position 322 to be proximate fifth position 850-5 of second passively-instrumented object 840-2 instead of fourth position 850-4 of first passively-instrumented object 840-1 with reference to FIG. 8. Alternately, or additionally, the configuration information may indicate a relative position (e.g., distance and/or direction) between the passively-instrumented object and the equipment. In embodiments, the relative position may be determined by an equipment position detection module configured to detect the relative position. For example, equipment position detection module 219B may be configured to detect the relative position. In embodiments, equipment position detection module 219B may be configured to receive position information for the passively-instrumented object from the object detection module 219A. In embodiments, equipment position detection module 219B may be configured to receive equipment position information for the equipment from wireless communication interface 216.

In embodiments, method 900 may comprise displaying an image of an equipment based on a position 970. The image may comprise a default image of the equipment. Alternately or additionally, the image may be generated in accordance with the captured image. The image may be displayed in accordance with a relative position generated by determining the position of an equipment relative to a passively-instrumented object 960. The image may be displayed on a display of a headset. For example, image 360 of equipment 320 may be displayed in image 350 presented via display 218 of wearable computing device 210 with brief reference to FIGS. 2 and 3C. One or more of a location and size of the image of equipment may be presented in an image in a display in accordance with the relative position generated by determining the position of an equipment relative to a passively-instrumented object 960. For example, image 360 may be display in a right side of image 350 in accordance with a position information of fifth position 850-5 of second passively-instrumented object 840-2 being detected on a right side of image 800. In embodiments, the image may be displayed in accordance with motion data detected by the headset. For example, the motion data may indicate that second passively-instrumented object 840-2 is positioned in a relative position on a right side of a field of view associated with an orientation of a headset indicated in the motion data. In embodiments, the motion data may indicate when the position of passively-instrumented object is outside a field of view of a headset, in addition to or as an alternative to, an indication of position otherwise provided by an image sensor of the headset.

In embodiments, displaying the image 970 may comprise displaying the image of the passively-instrumented object. The image of the passively-instrumented object may be displayed in accordance with the position of the passively-instrumented object. For example, a position in position information for second passively-instrumented object 840-2 may cause image 370 of first virtual passively-instrumented object to be displayed in a corresponding location within image 350. The image of the equipment may be displayed adjacent the image of the passively-instrumented object via the head-mounted display. The image of the virtual passively-instrumented object may comprise a default image. The image of the virtual passively-instrumented object may be generated independent of the captured image. In other embodiments, the image of the virtual passively-instrumented object may be generated in accordance with the captured image. In embodiments, displaying the position 970 may comprise displaying an image for each object of a plurality of passively-instrumented objects captured in an image. In some embodiments, the passively-instrumented objects may be displayed without a wearable device coupled to the passively-instrumented object. For example, an image displayed for a passively-instrumented object may comprise an image of a virtual non-instrumented object. The displayed image may be different from representation of a corresponding physical object for which image is displayed. Such an arrangement may avoid distraction that may be associated with the wearable device and/or dissimilarity relative to a non-training environment.

In embodiments, an image of an equipment (e.g., virtual equipment) or passively-instrumented object (e.g., virtual passively-instrumented object) may be presented in accordance with pose information. For example, the image may be rotated in accordance with the pose information. An image of virtual equipment 360 may be oriented in accordance with a pose indicated by position 322. Alternately or additionally, portions of the image may be generated in accordance with the pose. For example, an image of virtual second non-instrumented object 380 may comprise fingers positioned in accordance with pose 842-1. Accordingly, position information may modify where a virtual object (e.g., equipment or non-instrumented object or passively instrumented object) is displayed within an image of a simulated environment, as well as how the virtual object is displayed within the image of the simulated environment.

In various embodiments, "satisfy," "meet," "match," "associated with," or similar phrases used herein may include an identical match, a partial match, meeting certain criteria, matching a subset of data, a correlation, satisfying certain criteria, a correspondence, an association, an algorithmic relationship, and/or the like. Similarly, as used herein, "authenticate," "verify," "validate," or similar terms may include an exact authentication, verification, or validation; a partial authentication, verification, or validation; authenticating, verifying, or validating a subset of data; satisfying certain criteria; an association; an algorithmic relationship; and/or the like.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosures. The scope of the disclosure is accordingly to be limited by nothing other than the appended claims and their legal equivalents, in which reference to an element in the singular is not intended to mean "one and only one" unless explicitly so stated, but rather "one or more." Moreover, where phrase similar to "at least one of A, B, or C", "at least one of A, B, and C", or "and/or" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments," "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments. Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

The invention claimed is:

1. A method of detecting an equipment for virtual reality-based training, the method comprising:

receiving, via a wireless network interface of a wearable computing device, equipment position information from the equipment;

determining, by a processor of the wearable computing device, a position of a passively-instrumented object relative to the wearable computing device in accordance with a captured image; and displaying, via a display of the wearable computing device, an image of the equipment in accordance with the position of the passively-instrumented object, wherein determining the position of the passively-instrumented object comprises determining a position of a wearable device coupled to the passively-instrumented object.

2. The method of claim 1, wherein displaying the image of the equipment comprises displaying the image of the equipment in accordance with the position of the passively-instrumented object and the equipment position information from the equipment.

3. The method of claim 2, wherein the equipment position information comprises pose information and the equipment is displayed in the image of the equipment in accordance with the pose information.

4. The method of claim 2, wherein the position of the passively-instrumented object comprises a physical position of the passively-instrumented object in three-dimensional space.

5. The method of claim 1, wherein:
the wearable device comprises one or more lighted indicia; and
determining the position of the wearable device comprises detecting the one or more lighted indicia in the captured image.

6. The method of claim 1, further comprising capturing, via at least one image sensor of the wearable computing device, the captured image, wherein the passively-instrumented object is represented in the captured image and determining the position of the passively-instrumented object comprises detecting the position of the passively-instrumented object by applying image processing to the captured image.

7. The method of claim 1, wherein displaying the image of the equipment comprises displaying, via a head-mounted display, the image of the equipment adjacent to an image of the passively-instrumented object.

8. The method of claim 1, further comprising, prior to determining the position of the passively-instrumented object, receiving configuration information identifying the passively-instrumented object.

9. The method of claim 1, wherein:
determining the position of the passively-instrumented object comprises determining a relative position of the equipment relative to the position of the passively-instrumented object; and
displaying the image of the equipment comprises displaying the image of the equipment in accordance with the relative position of the equipment.

10. The method of claim 1, wherein the passively-instrumented object comprises a wrist of a user of the wearable computing device.

11. A simulation system configured for virtual reality-based training, comprising:
a wrist-mounted wearable device;
an equipment comprising:
a position sensor configured to detect equipment position information; and a first wireless network interface configured to transmit the equipment position information; and a wearable computing device comprising a display, a second wireless network interface, camera, a processor, and a non-transitory computer-readable storage medium storing instructions that, when executed by the processor, cause the wearable computing device to perform operations comprising:

receiving, via the second wireless network interface, the equipment position information from the equipment;

determining a position of a passively-instrumented object relative to the wearable computing device in accordance with a captured image; and displaying, via the display, an image of the equipment in accordance with the position of the passively-instrumented object and the equipment position information, wherein determining the position of the passively-instrumented object comprises determining a position of the wrist-mounted wearable device, wherein the wrist-mounted wearable device is coupled to the passively-instrumented object, and wherein determining the position of the wrist-mounted wearable device comprises detecting the wrist-mounted wearable device in the captured image.

12. The system of claim 11, wherein the equipment comprises a conducted electrical weapon.

13. The system of claim 11, wherein the wrist-mounted wearable device comprises a flexible substrate configured to removably attach to the passively-instrumented object.

14. The system of claim 11, wherein:
determining the position of the passively-instrumented object comprises generating a relative position of the equipment relative to the passively-instrumented object; and
displaying the image of the equipment comprises displaying the image of the equipment in accordance with the relative position.

15. One or more non-transitory computer-readable storage media storing instructions that, when executed by a processor of a wearable computing device, cause the wearable computing device to perform operations, comprising:
receiving, via a wireless network interface of the wearable computing device, equipment position information from the equipment;
capturing, via at least one camera of the wearable computing device, an image in a forward facing direction from a headset of the wearable computing device;
determining, by the processor of the wearable computing device, a position of a passively-instrumented object relative to the wearable computing device in accordance with the captured image; and
displaying, via a display of the wearable computing device, an image of the equipment in accordance with the position of the passively-instrumented object and the equipment position information, wherein determining the position of the passively-instrumented object comprises determining a position of a wristband coupled to the passively-instrumented object, and wherein determining the position of the wristband coupled to the passively-instrumented object comprises detecting the wristband coupled to the passively-instrumented object in the captured image.

16. The non-transitory computer-readable storage media of claim 15, wherein detecting the wristband comprises detecting lighted indicia of the wristband in the captured image, wherein the lighted indicia are represented in the captured image.

17. The non-transitory computer-readable storage media of claim 15, wherein the equipment position information comprises three degrees of rotational position information and the equipment is displayed in the image in accordance with the three degrees of rotational position information.

18. The non-transitory computer-readable storage media of claim 17, wherein the position of the passively-instrumented object comprises three degrees of translational position information associated with the passively-instrumented object.

19. The non-transitory computer-readable storage media of claim 18, wherein: determining the position of the passively-instrumented object comprises applying the translational position information to the rotational position information to determine a relative position comprising six degrees of freedom information for the equipment; and displaying the image of the equipment comprises displaying the image of the equipment in accordance with the relative position.

20. The system of claim 11, wherein:
the wrist-mounted wearable device comprises one or more lighted indicia;
detecting the wrist-mounted wearable device in the captured image comprises detecting the one or more lighted indicia in the captured image; and
the operations further comprise, prior to determining the position of the passively-instrumented object, receiving configuration information identifying the passively-instrumented object.

* * * * *